(12) United States Patent
Kennedy et al.

(10) Patent No.: US 9,701,781 B2
(45) Date of Patent: Jul. 11, 2017

(54) PHOTOCHEMICAL PREPARATION OF HYDROXYL-TERMINATED POLYISOBUTYLENES AND RELATED METHODS AND USES

(71) Applicants: Joseph Kennedy, Akron, OH (US); Nihan Nugay, Istanbul (TR); Turgut Nugay, Istanbul (TR)

(72) Inventors: Joseph Kennedy, Akron, OH (US); Nihan Nugay, Istanbul (TR); Turgut Nugay, Istanbul (TR)

(73) Assignee: THE UNIVERSITY OF AKRON, Akron, OH (US)

( * ) Notice: Subject to any disclaimer, the term of this patent is extended or adjusted under 35 U.S.C. 154(b) by 24 days.

(21) Appl. No.: 14/771,021

(22) PCT Filed: Mar. 4, 2014

(86) PCT No.: PCT/US2014/020180
§ 371 (c)(1),
(2) Date: Aug. 27, 2015

(87) PCT Pub. No.: WO2014/138001
PCT Pub. Date: Sep. 12, 2014

(65) Prior Publication Data
US 2016/0009850 A1 Jan. 14, 2016

Related U.S. Application Data

(60) Provisional application No. 61/772,143, filed on Mar. 4, 2013.

(51) Int. Cl.
| | | |
|---|---|---|
| C08J 3/28 | (2006.01) | |
| C08F 2/46 | (2006.01) | |
| C08G 61/04 | (2006.01) | |
| C08G 18/69 | (2006.01) | |
| C08F 110/10 | (2006.01) | |
| C08G 75/04 | (2016.01) | |
| C08F 8/00 | (2006.01) | |
| C08G 18/62 | (2006.01) | |
| C08G 18/75 | (2006.01) | |
| C08F 8/02 | (2006.01) | |
| C08F 8/26 | (2006.01) | |
| C08F 8/34 | (2006.01) | |
| C08G 18/40 | (2006.01) | |
| C08K 5/54 | (2006.01) | |

(52) U.S. Cl.
CPC .............. *C08G 18/696* (2013.01); *C08F 8/00* (2013.01); *C08F 8/02* (2013.01); *C08F 8/26* (2013.01); *C08F 8/34* (2013.01); *C08F 110/10* (2013.01); *C08G 18/4063* (2013.01); *C08G 18/6204* (2013.01); *C08G 18/758* (2013.01); *C08G 75/04* (2013.01); *C08J 3/28* (2013.01); *C08K 5/5403* (2013.01); *C08F 2810/30* (2013.01); *C08F 2810/40* (2013.01)

(58) Field of Classification Search
CPC ..... C08G 18/696; C08G 75/04; C08F 110/10; C08F 8/00
USPC .................. 522/127, 113, 1; 520/1
See application file for complete search history.

(56) References Cited

U.S. PATENT DOCUMENTS

| 5,448,000 A | * | 9/1995 | Gullapalli | ................ | C08F 8/36 525/333.7 |
|---|---|---|---|---|---|
| 2001/0018495 A1 | | 8/2001 | Scholl et al. | | |
| 2004/0068036 A1 | | 4/2004 | Halladay et al. | | |
| 2007/0255404 A1 | * | 11/2007 | Pinchuk | ................ | A61F 2/1616 604/521 |
| 2008/0255330 A1 | | 10/2008 | Faust et al. | | |
| 2010/0038471 A1 | * | 2/2010 | Olsen | ..................... | B64D 41/00 244/54 |
| 2010/0130696 A1 | * | 5/2010 | Kennedy | ................ | C08F 10/10 525/379 |

OTHER PUBLICATIONS

Magenau et al, Thiol-Terminated Polyisobutylene: Synthesis, Characterization, and Derivatization, Oct. 13, 2010, Journal of Polymer Science: Part A: Polymer Chemistry, vol. 48, 5505-5513.*

* cited by examiner

*Primary Examiner* — Jessica E Whiteley
(74) *Attorney, Agent, or Firm* — Renner Kenner Greive Bobak Taylor & Weber

(57) ABSTRACT

The present invention relates to novel hydroxyl-terminated polyisobutylenes and methods of making and using them. The hydroxyl-terminated polyisobutylenes contain a sulfur unit, —S—, within each terminal end group. The well-defined, sulfur containing, primary hydroxyl-terminated polyisobutylenes of the present invention can be simply, rapidly, and essentially quantitatively obtained by subjecting the unsaturated telechelic PIBs and mercapto alcohols to UV light-activated thiol-ene reactions. The resultant sulfur containing, primary hydroxyl-terminated polyisobutylenes can then be used in the production of polyurethanes and like materials.

19 Claims, 9 Drawing Sheets

PHOTOCHEMICAL PREPARATION OF HYDROXYL-TERMINATED POLYISOBUTYLENES AND RELATED METHODS AND USES

CROSS REFERENCE TO RELATED APPLICATIONS

This application claims the benefit of U.S. provisional patent application Ser. No. 61/772,143 entitled "Photochemical Preparation of Novel Hydroxyl-Terminated Polyisobutylenes and Their Use for the Preparation of Polyurethanes," filed Mar. 4, 2013, the disclosure of which is incorporated herein by reference in its entirety.

FIELD OF THE INVENTION

The present invention is relates to polyisobutylenes and, more particularly, to primary hydroxyl-terminated polyisobutylene (PIB) compounds. The present invention further relates to methods for the preparation of these primary hydroxyl-terminated PIB compounds and their use in the production of polyurethanes.

BACKGROUND OF THE INVENTION

Polyisobutylenes (PIBs) having two terminal functional groups are desirable and valuable intermediates for the preparation of a great variety of end products. For example, the di-hydroxyl telechelic PIB (HO-PIB-OH) and the di-amine telechelic PIB ($NH_2$-PIB-$NH_2$) are key ingredients for the preparation of the soft segment of hydrolytically-oxidatively resistant PIB-based polyurethanes and polyureas, respectively.

Methods for the preparation of some HO-PIB-OH compounds are well known in the art and, in some cases, have been patented. For example, primary alcohol-terminated PIB compounds have been produced from vinylidene groups or from allyl groups. Further, the use of these particular patented HO-PIB-OH compounds for the preparation of polyurethanes has also be described. It will be appreciated that "hydroxyl-terminated" and "alcohol-terminated" are used interchangeably.

However, the production of these primary alcohol-terminated PIB compounds, such as $HOCH_2$-PIB-$CH_2OH$, have been prepared in the past using various synthesis methods that are, to say the least, cumbersome and uneconomical. For instance, one example of the production of primary alcohol-terminated PIBs requires the use of expensive boron chemicals and related complexes through the use of a hydroboration/oxidation process. Alternatively, the allyl-terminated PIBs and vinylidene-terminated PIBs may undergo bromination via any of a number of known techniques, including anti-Markovnikov addition, and then be converted to the hydroxyl-terminated PIBs by nucleophilic substitution of the bromine. Again, such processes require costly, aggressive and expensive chemicals such as bromine, and as such, the cost of manufacturing primary alcohol-terminated PIB compounds has been, in some respects, too high for commercial production.

Given the above, numerous efforts have been made to develop a more simple and economical process for the manufacture of primary alcohol-terminated PIB compounds, HO-PIB-OH. The polyurethane industry alone has spent millions of dollars on the research and development of various processes for the manufacture of HO-PIB-OHs. Heretofore, such efforts have bee met with only limited success in reducing the cost associated with producing primary alcohol-terminated PIB compounds.

Accordingly, the need exists for a more efficient and more economical process for the production of primary alcohol-terminated PIBs that can then be used in the production of polyurethanes and other materials.

SUMMARY OF THE INVENTION

The present invention generally relates to novel hydroxyl-terminated polyisobutylenes and methods of making and using them. The hydroxyl-terminated polyisobutylenes are novel in that they contain a sulfur unit, —S—, within each terminal end group. These sulfur containing, primary hydroxyl-terminated PIBs are believed to be novel compounds that can act as intermediates in the preparation and production of various materials, including polyurethanes. The addition of the sulfur unit within the end groups of the PIBs is believed to have no, or only de minimus, deleterious affect on the mechanical or chemical properties of the PIB composition and/or the polyurethane or other materials produced therefrom.

It has been found that the well-defined, sulfur containing, primary hydroxyl-terminated polyisobutylenes of the present invention can be simply, rapidly, and essentially quantitatively obtained by subjecting the unsaturated telechelic PIBs and mercapto alcohols, identified generally herein by the abbreviation (HS—R—OH), to UV light-activated (i.e., photochemical) thiol-ene reactions. That is, by reacting linear or branched telechelic PIBs having unsaturations within the end groups of the PIBs with mercapto alcohols, such as mercapto ethanol, in the presence of UV light, a photochemical thiol-ene click reaction occurs that produces the sulfur containing, primary hydroxyl-terminated PIBs of the present invention. Advantageously, the reactant PIBs and mercapto alcohols are relatively inexpensive, particularly when compared to some of the other reactants used in other methods for the production of primary hydroxyl-terminated PIBs and, as noted above, the reaction is rapid and essentially quantitative in the conversion of exo-terminated and endo-terminated PIBs to primary hydroxyl-terminated PIBs.

It will be appreciated that polyisobutylenes with external (exo-) and internal (endo-) terminated unsaturations are always formed in conventional (non-living) isobutylene polymerizations. That is, the conventional polymerization of isobutylene will always result (unless otherwise manipulated) in the polyisobutylenes being terminated with one of two possible end groups, namely exo unsaturation, identified by the chemical structure PIB-$CH_2$—$C(CH_3)$=$CH_2$, or endo unsaturation, identified by the chemical structure PIB-CH=$C(CH_3)_2$. The exo unsaturation end group is often called a vinylidene group, and may be abbreviated herein with the designation -V. The endo unsaturation end group may be abbreviated herein with the designation -E.

These unsaturated -V and -E end groups arise because of ever-present chain transfer reactions in isobutylene polymerizations. In most conventional (non-living) polymerizations, the polymerization reaction will roughly provide about 70% exo unsaturation (-V end groups) and about 30% endo unsaturation (-E end groups). Notably, this ratio is rather insensitive to changes in reaction parameters, e.g., solvent used, temperature, reagent concentrations, etc.

The chemical reactivity of the exo unsaturations (-V end groups) is significantly higher than that of the endo unsaturations (-E end groups). Thus, efforts have been made heretofore to maximize the concentration of the exo unsaturations. For example, BASF Company, Florham Park, N.J., sells one polyisobutylene product under the brand name Glissopal® that contains more than 90% exo terminal unsaturations. This product is used as an intermediate in various industrial applications.

It will be further appreciated that, with an additional reaction step, the polyisobutylenes with allyl end groups (-allyl), identified by the structure PIB-CH$_2$—CH=CH$_2$, can be obtained and used in the present invention. The production of ally-terminated PIBs is well known in the art as can be generally understood based upon a review of Kennedy et al. U.S. Pat. No. 4,758,631, the disclosure of which is incorporated herein by reference.

The mercapto alcohols are also well known and commonly inexpensive. Mercapto alcohols are typically identified by the formula HS—R—OH, wherein R is a carbon chain having 1 to 6 carbon atoms. One example of a suitable mercapto alcohol is 2-mercaptoethanol, HS—CH$_2$—CH$_2$—OH. The reaction of the mercapto alcohol with the exo unsaturated (-V end groups), endo unsaturated (-E end groups) or allyl unsaturated end groups in the presence of light is more fully explained below.

The present invention further relates to the preparation of novel polyurethanes from the resultant sulfur containing, primary hydroxyl-terminated PIBs. That is, polyurethane may be produced as the reaction product of a soft segment, such as the sulfur containing, primary hydroxyl-terminated PIBs and a hard segment, such as a diisocyanate. This reaction will be further detailed below.

Advantages of the present invention over existing prior art relating to telechelic PIBs and PIBs for use in the production of polyurethanes and polyureas, which shall become apparent from the description which follows, are accomplished by the invention as hereinafter described and claimed.

One or more embodiments of the present invention provide for a telechelic polyisobutylene composition having at least one primary hydroxyl end group, wherein a sulfur atom is present within the at least one primary hydroxyl end group. In one embodiment, the sulfur atom is present within 6 carbon atoms of the hydroxyl unit in the primary hydroxyl end group. In another embodiment, the sulfur atom is present within 2 carbon atoms of the hydroxyl unit in the primary hydroxyl end group. In other or the same embodiments, the telechelic polyisobutylene composition further includes an initiator core and at least two polyisobutylene chains extending from the initiator core, wherein each one of the at least two polyisobutylene chains is terminated with a primary hydroxyl end group having a sulfur atom contained therein. In further or the same embodiments, the at least two polyisobutylene chains comprises an —S—CH$_2$CH$_2$—OH moiety within the primary hydroxyl end group. In some embodiments, the initiator core may be a difunctional aromatic initiator core and the telechelic polyisobutylene composition is linear and di-telechelic. In other embodiments, the initiator core may be a trifunctional aromatic initiator core and the telechelic polyisobutylene composition is branched and tri-telechelic.

As noted above, the at least one primary hydroxyl end group may be -V end groups, -E end groups or allyl end groups, as shown in the chemical structural formulas below. It will be appreciated that R includes the polyisobutylene polymer chain.

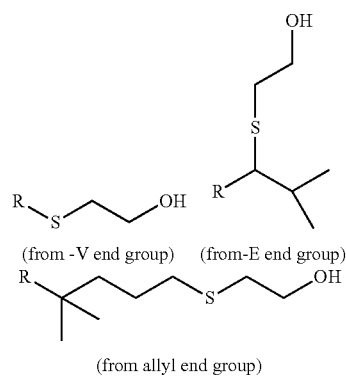

(from -V end group)  (from-E end group)

(from allyl end group)

In light of the above, it will be appreciated that in one or more embodiments, the telechelic polyisobutylene composition as disclosed herein may have one of the following formulas (I), (II), (III), or (IV), wherein n and n' are each an integer from 2 to 5,000.

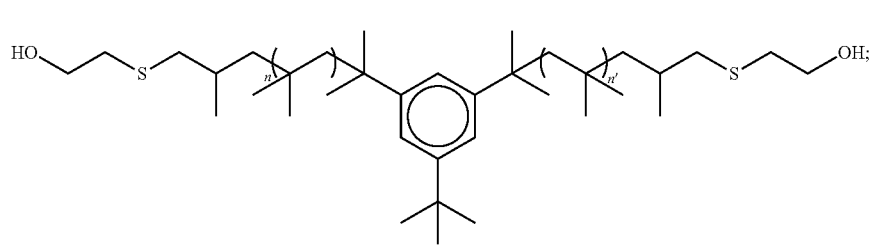

(I)

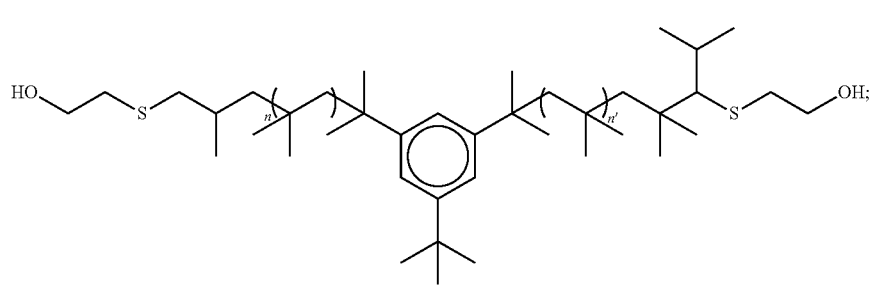

(II)

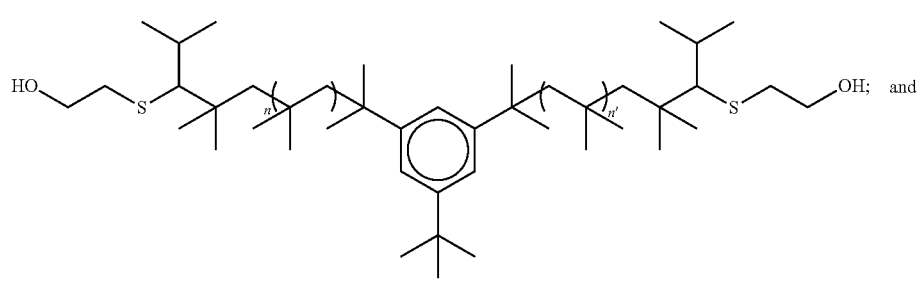

(III)

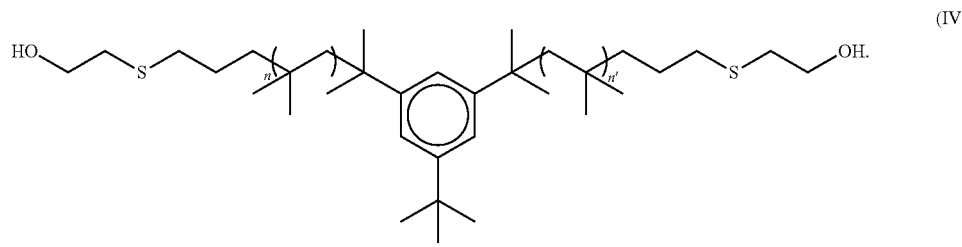

(IV)

In one or more other embodiments, the present invention may be achieved by a telechelic polyisobutylene composition including the photochemical thiol-ene reaction product of a polyisobutylene polymer having at least one end group selected from —CH$_2$—CH(CH$_3$)=CH$_2$, —CH=C(CH$_3$)$_2$, and —CH$_2$—CH=CH$_2$ and combinations; and a mercapto alcohol, in the presence of light, such as UV light. In one embodiment, the mercapto alcohol is 2-mercapto ethanol. In the same or other embodiments, the polyisobutylene polymer has a formula selected from the group consisting of:

(V)

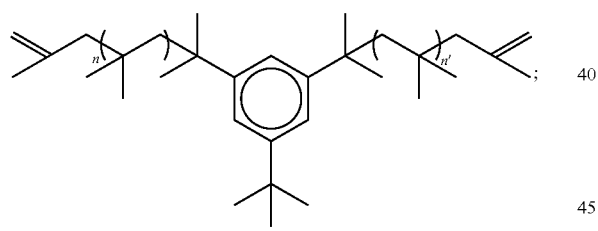

(VI)

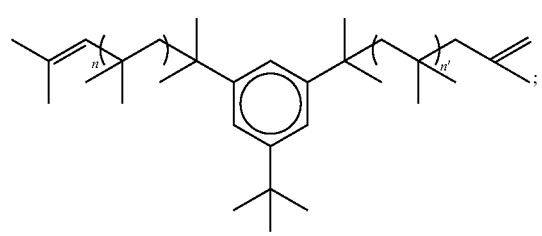

(VII)

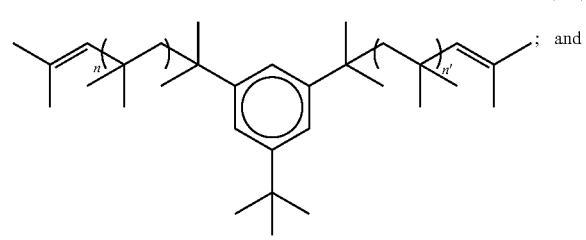
; and

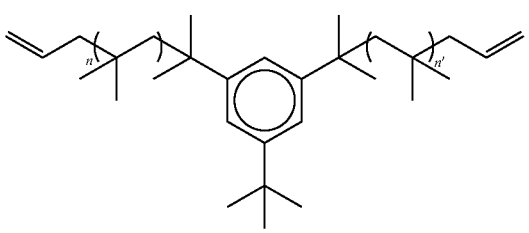

(VIII), wherein n and n' are each an integer from 2 to 5,000.

In still other embodiments, the present invention may be achieved by a polyurethane composition having improved hydrolytic-oxidative stability, including the reaction products of: one or more telechelic polyisobutylenes having at least two hydroxyl-terminated end groups, the at least two hydroxyl-terminated end groups each having a sulfur atom present therein; and one or more diisocyanates. In one or more embodiments, the one or more diisocyanates are selected from the group consisting of 4,4-methylene dicyclohexyl diisocyanate (HDMI), 4,4-methylene diphenyl diisocyanate (MDI), and combinations thereof. In the same or other embodiments, each of the at least two hydroxyl-terminated end groups of the one or more telechelic polyisobutylenes may include an —S—CH$_2$CH$_2$—OH moiety. In other embodiments, the one or more telechelic polyisobutylenes are selected from the group consisting of:

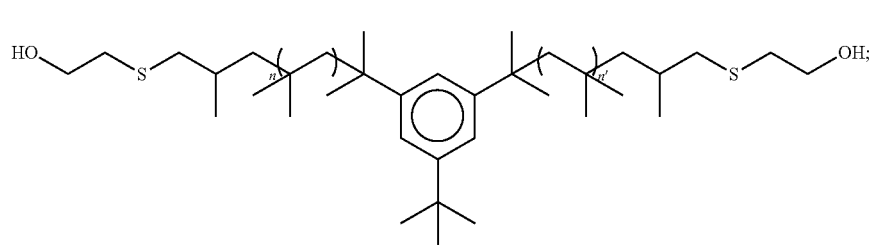

(I)

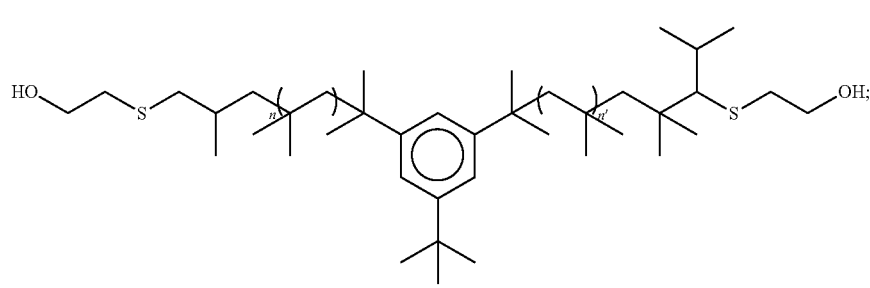

(II)

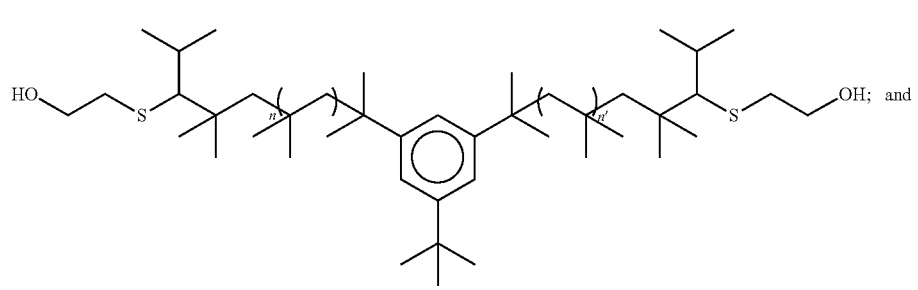

(III)

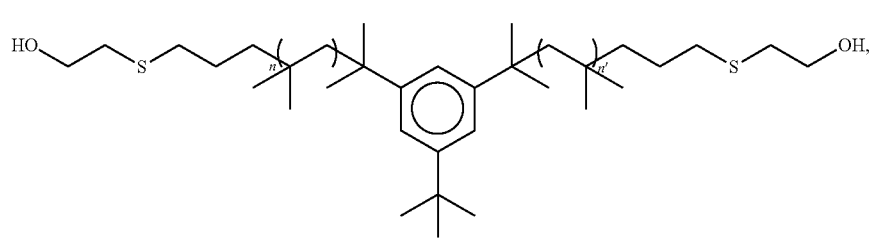

(IV)

wherein n and n' are the same or different and are each an integer ranging from 2 to 5,000.

Still other embodiments of the present invention may be achieved by a method of making a telechelic polyisobutylene composition having one or more hydroxyl-terminated end groups having a sulfur atom contained therein. The method includes the steps of providing a polyisobutylene polymer having at least one end group selected from the end groups —CH$_2$—CH(CH$_3$)=CH$_2$, —CH$_2$=C(CH$_3$)$_2$, and CH$_2$—CH=CH$_2$, and combinations thereof; and combining the polyisobutylene polymer with a stoichiometricly sufficient quantity of a mercapto alcohol to provide a mixture. The mixture is then irradiated with light, such as UV light. In one embodiment, the mercapto alcohol is 2-mercapto ethanol. In the same or different embodiments, the polyisobutylene polymer has a formula selected from the group consisting of:

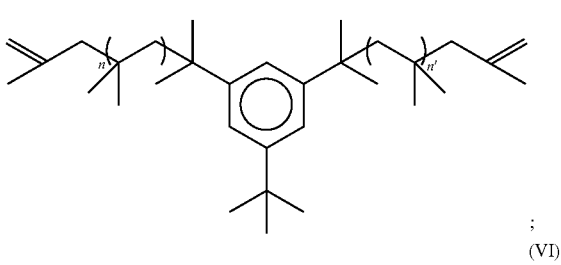

(V)

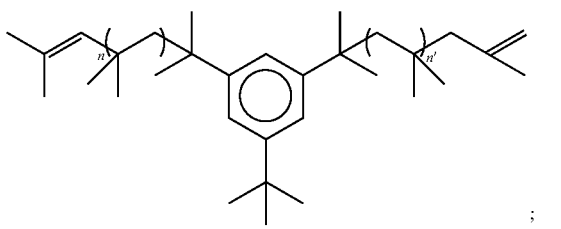

(VI)

-continued

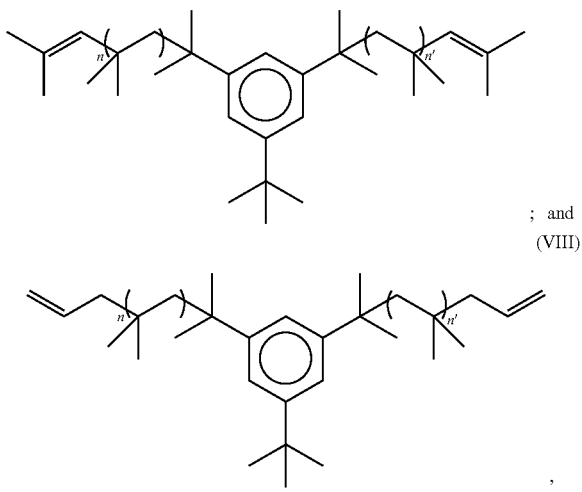

wherein n and n' are each an integer from 2 to 5,000.

Finally, still yet another embodiment of the present invention, may be achieved by a method for the production of a PIB-based polyurethane having improved hydrolytic-oxidative stability, the method including: providing a photochemically-prepared telechelic polyisobutylene having at least two primary hydroxyl-terminated end groups, wherein a sulfur atom is present within the primary hydroxyl-terminated end groups; and adding a diisocyanate selected from the group consisting 4,4-methylene dicyclohexyl diisocyanate (HDMI), 4,4-methylene diphenyl diisocyanate (MDI), and combinations thereof, and a catalyst, to the photochemically-prepared telechelic polyisobutylene, to provide a polyurethane having improved hydrolytic-oxidative stability.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

Figure 1:
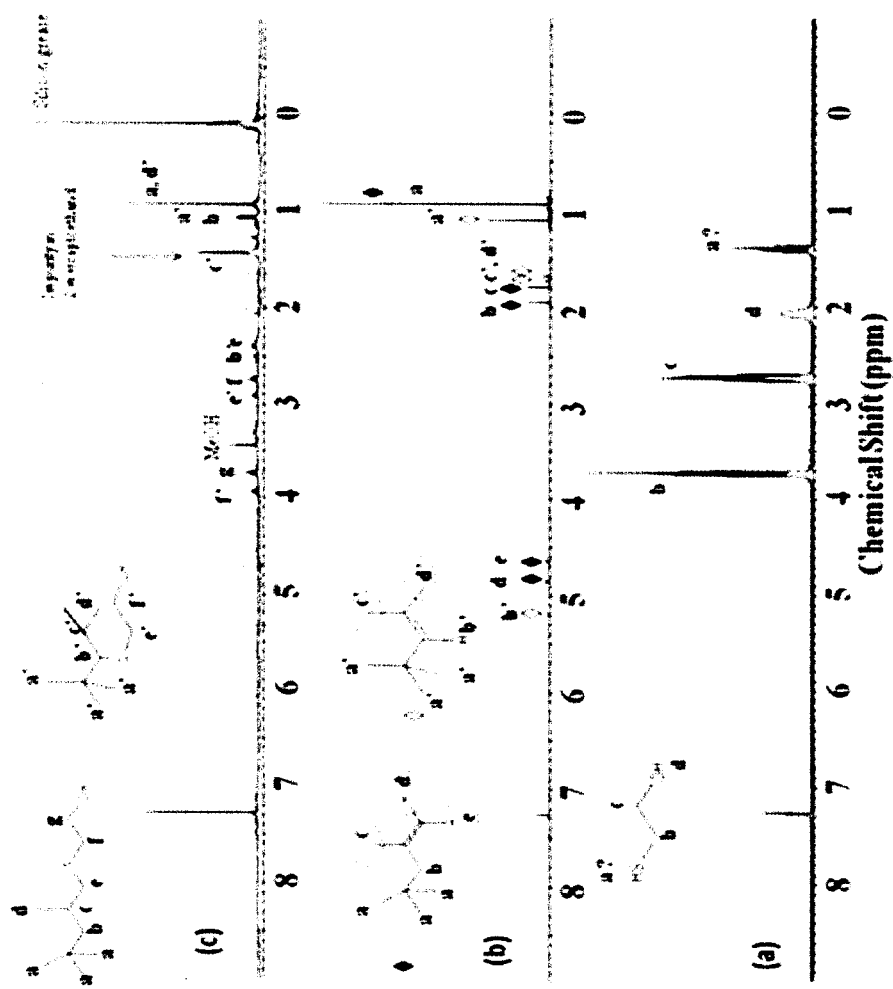
FIG. 1 is a $^1$H NMR spectra taken of: (a) 2-mercapto ethanol, (b) 2,4,4-trimethyl-1-pentene and 2,4,4-trimethyl-2-pentene, and (c) 2-[(2,4,4-trimethylpentyl)thiol]-ethanol and 2-[(1 ethyl-2,2-dimethylpropyl)thiol]-ethanol.

As mentioned above, the present invention is directed to novel hydroxyl-terminated polyisobutylenes and methods of making and using them. It has been found that well-defined hydroxyl-terminated polyisobutylenes can be simply, rapidly and essentially quantitatively obtained by subjecting certain telechelic PIBs having unsaturated end groups and mercapto alcohols (HS—R—OH) to UV-activated thiol-ene reactions, and that these HO-PIB-OHs are suitable for the preparation of novel polyurethanes and polyureas.

In one aspect, the present invention is directed to hydroxyl-terminated PIBs having at least one primary —OH terminated end group having a sulfur atom contained therein. In some embodiments, the sulfur atom may be within from 1 to 6 carbon atoms away from the —OH terminus of the end group. In other embodiments, and particularly where 2-mercapto ethanol is used in the photochemical thiol-ene reaction, the sulfur atom will be within 2 carbon atoms away from the —OH terminus of the end group. In some embodiments, the hydroxyl-terminated polyisobutylenes of the present invention have a sulfur atom within 3 carbon atoms of the —OH terminus of the end group. Here, as well as elsewhere in the specification and claims, individual range limits can be combined to form alternative non-disclosed range limits.

The PIBs of the present invention are preferably linear, but it may also be branched. In some embodiments, the PIBs of the present invention comprise polyisobutylene chains having from about 2 to about 5,000 isobutylene repeating units. In other embodiments, the composition may have one or more polyisobutylene chains having from about 5 to about 4,000 isobutylene repeating units. In still some other embodiments, the composition may have one or more polyisobutylene chains having from about 10 to about 2,000 isobutylene repeating units.

In many embodiments of the present invention, the PIBs of the present invention will have a number average molecular weight of at least 1000 g/mol. In some embodiments, the number average molecular weight will be between about 1000 g/mol and about 50,000 g/mol. In other embodiments, the molecular weight range will be between about 1,100 g/mol and 10,000 g/mol. In still other embodiments, the molecular weight range will be between about 1,500 g/mol and 5,000 g/mol. Typically, a molecular weight of greater than 1000 g/mol and less than 6,000 g/mol will suffice.

In some embodiments, the telechelic PIBs of the present invention comprise a PIB polymer having an initiator core from which extends at least two primary —OH terminated polyisobutylene chains, each having a sulfur atom contained within the —OH terminated end groups. In these embodiments, each of the polyisobutylene chains are terminated with an end group having at least a primary —OH terminus and a sulfur atom contained within the end group.

In these embodiments, the initiator core may include any known core. In one instance, the core may comprise a residue of the initiator used to form the PIB and may be formed from any suitable PIB reaction initiator including, for example, 5-tert-butyl-1,3-(2-methoxy-2-propyl)benzene (TBDMPB).

In some embodiments, the hydroxyl-terminated PIBs of the present invention have the formula:

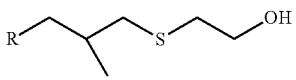

wherein R is a polyisobutylene chain. R is preferably a linear polyisobutylene chain, but it may also be branched. In some embodiments, R may be a polyisobutylene chain having from about 2 to about 5,000 isobutylene repeating units. It will be appreciated that this end of such a PIB composition will be formed with the PIB polymer that is photochemically, thiol-ene reacted with a mercapto alcohol and includes a -V end group, or has an external (exo) unsaturation. Such a -V end group would include —CH$_2$—CH(CH$_3$)=CH$_2$, prior to the addition of the mercapto alcohol.

In some other embodiments, the hydroxyl-terminated polyisobutylenes of the present invention have the formula:

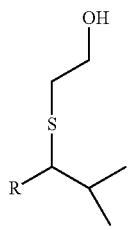

wherein R is a polyisobutylene chain. R is again preferably a linear polyisobutylene chain, but it may also be branched. In some embodiments, R may be a polyisobutylene chain having from about 2 to about 5,000 isobutylene repeating units. It will be appreciated that this type of PIB composition will be formed with the PIB polymer that is photochemically, thiol-ene reacted with a mercapto alcohol and includes an -E end group, or has an internal (endo) unsaturation. Such an -E end group would include —CH$_2$=C(CH$_3$)$_2$ prior to the addition of the mercapto alcohol.

In some other embodiments, the hydroxyl-terminated polyisobutylenes of the present invention have the formula:

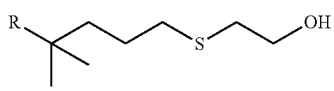

wherein R is a polyisobutylene chain. R is preferably a linear polyisobutylene chain, but it may also be branched. In some embodiments, R may be a polyisobutylene chain having from about 2 to about 5,000 isobutylene repeating units. It will be appreciated that this type of PIB composition will be formed with the PIB polymer that is photochemically, thiol-ene reacted with a mercapto alcohol and includes an allyl end group. Such an allyl end group would include —CH$_2$—CH=CH$_2$, prior to additional of the mercapto alcohol.

With respect to exo and endo unsaturations, it will be appreciated that, where linear polyisobutylene compositions are being provided having two polyisobutylene polymer chains forming from an initiator core, there are three possible linear polyisobutylenes. In one, both end groups have exo unsaturations, and may be denoted as V-PIB-V. In a second possibility, both ends will have endo unsaturations, and may be denoted as E-PIB-E. However, there is a third possibility, which is to have one end, as a -V end group, having an exo unsaturation, and the other end, as an -E end group, having an endo unsaturation. This may be denoted interchangeably as V-PIB-E or E-PIB-V. For convenience, linear PIBs with allyl end groups may be denoted as A-PIB-A.

Thus, for embodiments where both end groups have exo unsaturations, the polyisobutylene polymers used to form the hydroxyl-terminated polyisobutylenes of the present invention have the formula (V):

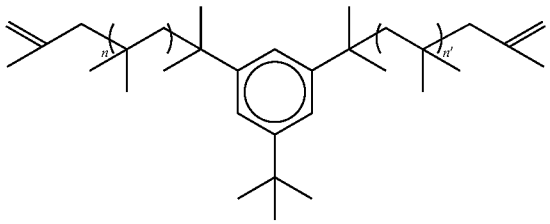

wherein n and n' are each an integer from 2 to 5,000.

For embodiments where one of the two end groups has an endo unsaturation and the other of the end groups has an exo unsaturation, the polyisobutylene polymers used to form the hydroxyl-terminated polyisobutylenes of the present invention have the formula (VI):

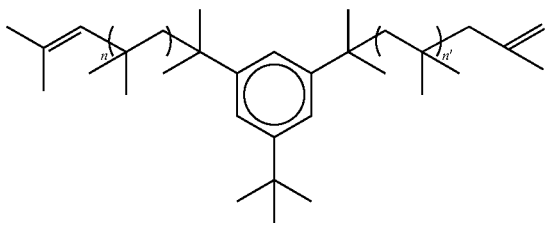

wherein n and n' are each an integer from 2 to 5,000.

And for embodiments where both end groups have endo unsaturations, the polyisobutylene polymers used to form the hydroxyl-terminated polyisobutylenes of the present invention have the formula (VII):

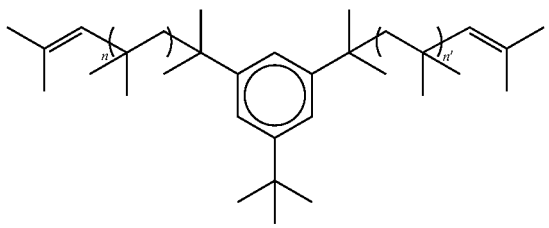

wherein n and n' are each an integer from 2 to 5,000.

In some embodiments, polyisobutylene polymers used to form the hydroxyl-terminated polyisobutylenes of the present invention will have allyl end group and thus have the formula (VIII):

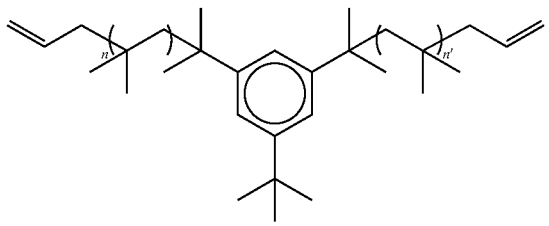

wherein n and n' are each an integer from 2 to 5,000.

In reviewing more particularly the polyisobutylene polymers used to form the hydroxyl-terminated polyisobutylene compositions, it is noted again that the PIB polymers may be linear or branched. When linear, that PIB composition is di-telechelic in that the polyisobutylene polymer chain grows via conventional polymerization only from two ends from a bi-functional core. Thus, at least some embodiments of the present invention may comprise a linear PIB having a difunctional initiation core from which extend two polyisobutylene chains as described above, but with two allyl end groups, with two exo unsaturated end groups, with two endo unsaturated end groups, or with one exo and one endo unsaturated end groups.

In some embodiments, these PIB polymers may be obtained by initiating the polymerization of isobutylene with dimethyl-5-tert-butyl-1,3-benzyl dicarboxylate (DMT-BBDC) difunctional initiator under conventional (non-living) cationic polymerization conditions as discussed above and in Example 5, below. One of ordinary skill in the art will be able to create these PIB polymers from the difunctional initiator without undue experimentation, as the methods for preparation are well known in the art. In some embodiments these PIB polymers may be made as set forth in Example 6.

The polyisobutylene polymers used to form the hydroxyl-terminated polyisobutylenes of at least some embodiments of the present invention may comprise one or, preferably, two polyisobutylene chains extending from a difunctional initiator core. In these embodiments, the difunctional initiator core comprises a residue of the difunctional initiator used to form the PIB, and may be formed from any suitable PIB reaction initiator including, without limitation, 5-tert-butyl-1,3-(2-methoxy-2-propyl)benzene (TBDMPB).

The TBDMPB difunctional initiator may be synthesized my any means known in the art. In some embodiments, the TBDMPB difunctional initiator may be produced according to Scheme 1.

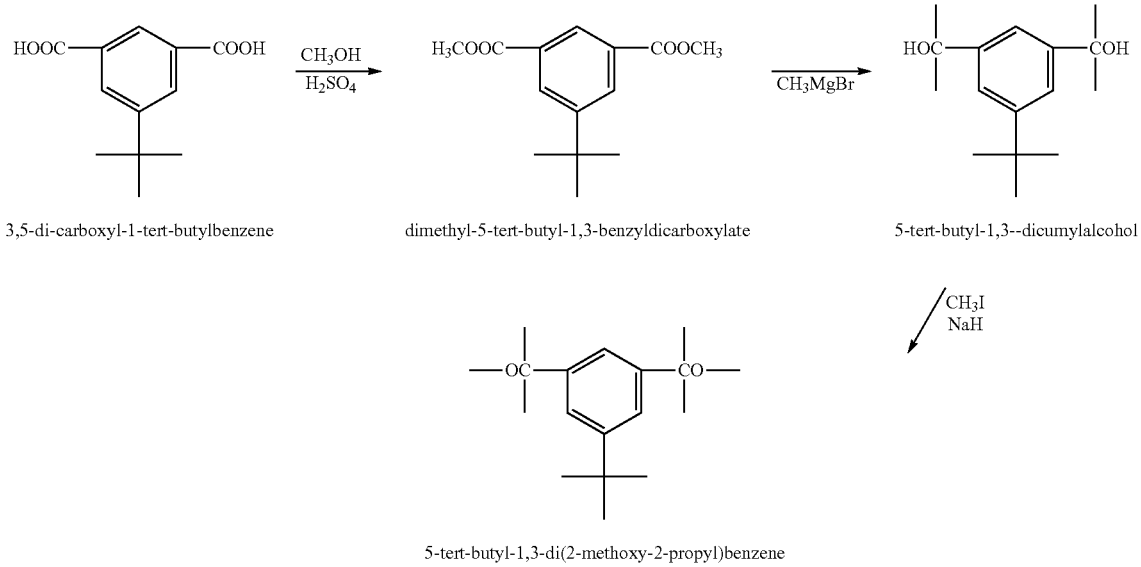

An exemplary strategy for the preparation of an PIB polymer, and in this example, an A-PIB-A polymer, from the TBDMPB difunctional initiator described above is shown in Scheme 2 below.

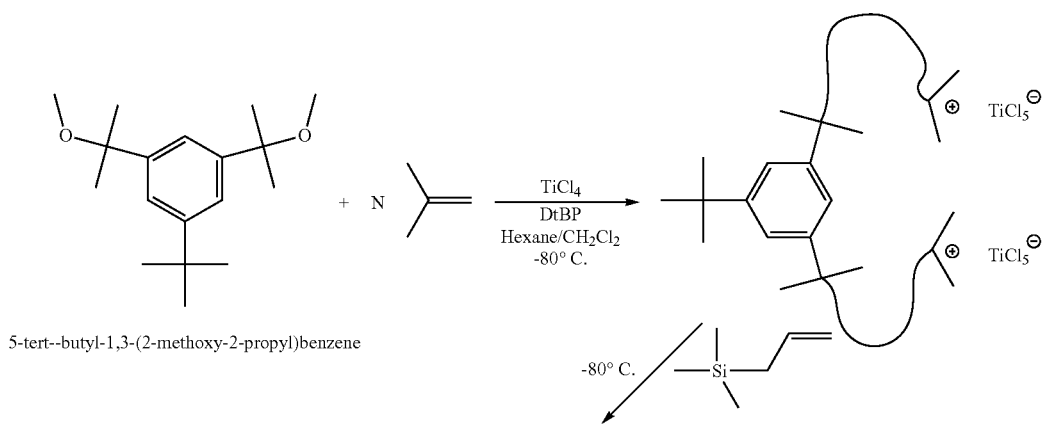

-continued

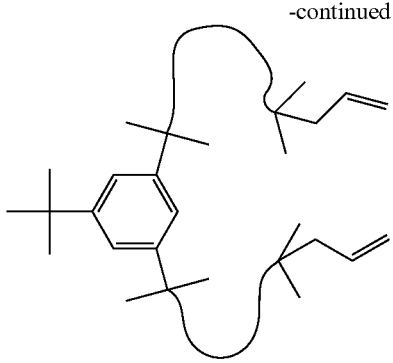

In some embodiments, an A-PIB-A polymer according to at least one embodiment of the present invention may be prepared from the TBDMPB difunctional initiator as set forth in Example 6, below.

Next, the polyisobutylene polymers having one or two exo unsaturated end group, endo unsaturated end group, or allyl end group, as described above, are reacted with a mercapto alcohol (in the presence of a catalyst and ultraviolet light) to form the hydroxyl-terminated polyisobutylenes of the present invention.

In some embodiments, the mercapto alcohols used to form the hydroxyl-terminated polyisobutylenes of the present invention are comprised of a linear hydrocarbon chain of from 1 to 6 carbon atoms in length. Mercapto alcohols have a primary hydroxyl group on one end a primary mercapto (thiol) group on the opposite end. As used herein, the terms "mercapto," "mercapto group," "thiol," and "thiol group" are used interchangeably to refer to an end group having the formula —SH. In some embodiments, the mercapto alcohol has a linear hydrocarbon chain of from 1 to 6 carbon atoms. In some embodiments, the mercapto alcohol has a linear hydrocarbon chain of 2 to 3 carbon atoms. In some embodiments, the mercapto alcohol has a linear hydrocarbon chain of 2 carbon atoms. In some embodiments, the mercapto alcohol is 2-mercapto ethanol and has the formula:

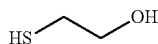

The terms "2-mercapto ethanol" and "SEOH" are used interchangeably herein to refer to HS—CH$_2$CH$_2$—OH.

Any catalyst known in the art for use with UV light-activated thiol-ene reactions may be used, and one of ordinary skill in the art will be able to select a suitable catalyst without undue experimentation. Suitable catalyst include, without limitation, 2,2-dimethoxy-2-phenyl acetophenone (DMPA).

Any solvent known in the art for use with the particular polyisobutylene polymer, mercapto alcohol, and catalyst to be reacted may be used provided that the solvent does not hinder the UV light-activated thiol-ene reaction between the polyisobutylene polymer and the mercapto alcohol. One of ordinary skill in the art will be able to select a suitable solvent without undue experimentation. Suitable solvents include, without limitation, dichloromethane (CH$_2$Cl$_2$), and combinations thereof. In some embodiments, the solvent is dichloromethane (CH$_2$Cl$_2$).

In another aspect of the invention, the present invention is directed to methods of making the hydroxyl-terminated polyisobutylene compositions. The hydroxyl-terminated polyisobutylene compositions of the present invention are formed from telechelic polyisobutylene polymers having at least one and preferably at least two unsaturated end groups. It will be appreciated that the mercaptyl group of a mercapto alcohol is reacted at the C═C bond, via a UV light-activated thiol-ene reaction such that the sulfur atom becomes bonded to the polymer with the opposite end, the —OH group being left for further functionalization.

In some embodiments, these polyisobutylene polymers have the external (exo) and internal (endo) terminal unsaturations that are always formed in conventional (non-living) isobutylene polymerizations. These polyisobutylenes may have the general formulae PIB-CH$_2$—C(CH$_3$)═CH$_2$ (exo) or PIB-CH═C(CH$_3$)$_2$ (endo).

As used herein, the terms "exo terminal unsaturation," "exo unsaturation," "exo olefin termini," and "vinylidene group," are used interchangeably and refer to an end group having the formula —CH$_2$—C(CH$_3$)═CH$_2$, and may be abbreviated as -V. Also, as used herein, the terms "endo terminal unsaturation," "endo unsaturation," and "endo olefin termini" are used interchangeably and refer to an end group having the formula —CH═C(CH$_3$)$_2$, and may be abbreviated as -E. These unsaturated -V and -E end groups arise because of ever-present chain transfer reactions in isobutylene polymerizations. In most conventional (non-living) isobutylene polymerizations typically about 70% exo and 30% endo end groups form, and this ratio has been found to be rather insensitive to changes in reaction parameters, e.g., solvent, temperature, reagent concentrations.

In some embodiments, the polyisobutylene polymers used to form the hydroxyl-terminated polyisobutylenes of the present invention comprise a polyisobutylene chain having an exo unsaturated end group and may be expressed by the general formula:

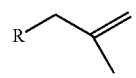

wherein R is a polyisobutylene chain.

In some embodiments, the polyisobutylene polymers used to form the hydroxyl-terminated polyisobutylenes of the present invention comprise a polyisobutylene chain having an endo unsaturated end group and may be expressed by the general formula:

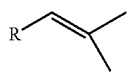

wherein R is a polyisobutylene chain.

In some embodiments, the polyisobutylene polymers used to form the hydroxyl-terminated polyisobutylenes of some embodiments of the present invention may comprise a linear PIB having a bifunctional initiation core from which extend two polyisobutylene chains, each one having an exo unsaturated end group or an endo unsaturated end group. Accordingly, the polyisobutylene polymers of these embodiments will either have two exo unsaturated end groups, two endo unsaturated end groups, or one exo unsaturated end group and one endo unsaturated end group. These telechelic bi-functional PIBs may, for convenience, be referred to herein by the formula V'/E-PIB-V'/E.

In some embodiments, these V'/E-PIB-V'/E polymers may be obtained by initiating the polymerization of isobutylene with dimethyl-5-tert-butyl-1,3-benzyl dicarboxylate (DMTBBDC) difunctional initiator and converting the tert-chlorine end groups of the polymer by quantitative chain end dehydrochlorination with potassium t-butoxide (tBuOK). One of ordinary skill in the art will be able to create these V'/E-PIB-V'/E polymers without undue experimentation. In some embodiments these V'/E-PIB-V'/E polymers may be made as set forth in Example 3.

In some embodiments, the polyisobutylene polymers used to form the hydroxyl-terminated polyisobutylenes of the present invention comprise polyisobutylene chains having allyl end groups. In some embodiments, these polyisobutylene polymers have the general formula:

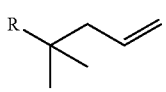

wherein R is a PIB having one or two polyisobutylene chains.

To form the hydroxy-terminated PIB polymers of the present invention, the polyisobutylene polymers having one or two exo unsaturated end group, endo unsaturated end group, or allyl end group, as described above, are placed in a suitable container and combined with a mercapto alcohol, a catalyst, and a suitable solvent, as described above. In some embodiments, these materials are combined under a blanket of nitrogen. Next, the solution is irradiated with ultraviolet (UV) light to activate the thiol-ene reaction. In some embodiments, the solution may be irradiated with UV light using a medium pressure Hg lamp as the UV source. The exact reaction parameters will depend upon the particular materials being reacted and is well within the ability of one of ordinary skill in the art to determine without undue experimentation. In some embodiments, solution may be irradiated with UV light using a medium pressure Hg lamp for 15 min at 0° C. to complete the reaction.

As a result of the photochemical thiol-ene reaction, a telechelic polyisobutylene composition having at least one, and preferably at least two, primary hydroxyl end groups is produced, wherein a sulfur atom, from the mercapto alcohol, is now present within each primary hydroxyl end group.

Accordingly, where the reactant PIB polymer includes two exo unsaturated end groups reacted with SEOH, the resultant hydroxyl-terminated polyisobutylene composition of the present invention will have the formula:

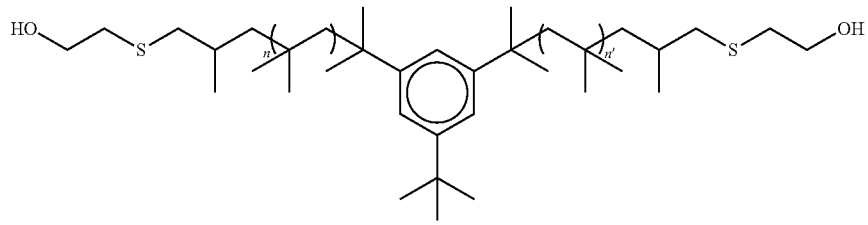

wherein n and n' are each an integer from 2 to 5,000.

In other embodiments, where the reactant PIB polymer includes one exo unsaturated end group and one endo unsaturated end group reacted with SEOH, the resultant hydroxyl-terminated polyisobutylenes of the present invention will have the formula:

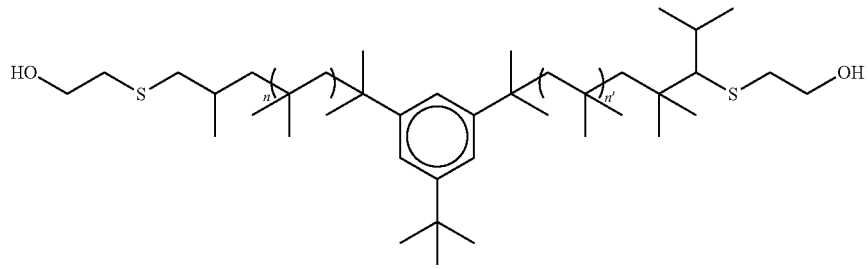

wherein n and n' are each an integer from 2 to 5,000.

In still other embodiments, where the reactant PIB polymer includes two endo unsaturated end groups reacted with SEOH, the resultant hydroxyl-terminated polyisobutylenes of the present invention will have the formula:

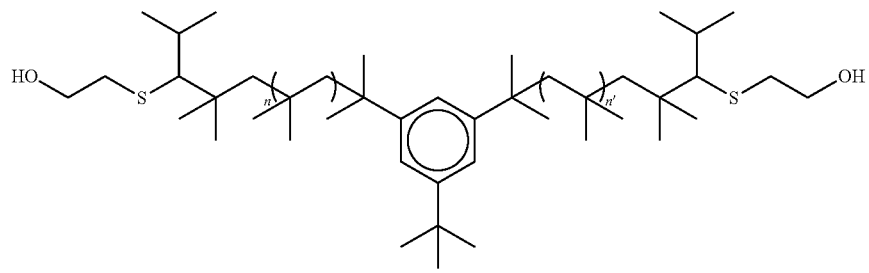

wherein n and n' are each an integer from 2 to 5,000.

Finally, in yet other embodiments, where the reactant PIB polymer includes two allyl unsaturated end groups reacted with SEOH, the resultant hydroxyl-terminated polyisobutylenes of the present invention have the formula:

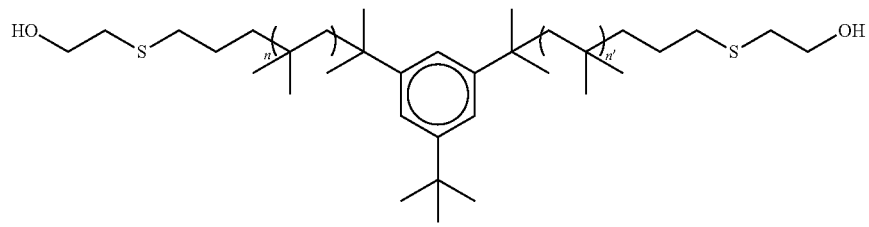

wherein n and n' are each an integer from 2 to 5,000.

Exemplary mechanisms for reacting PIB polymers having an exo unsaturated end group, an endo unsaturated end group and/or an allyl end group with 2-mercapto ethanol to form the corresponding alcohol-terminated polyisobutylene are set for in Schemes 3, 4, and 5, respectively, below.

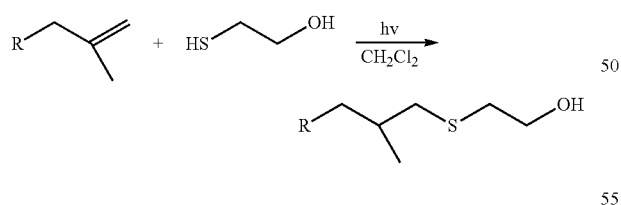

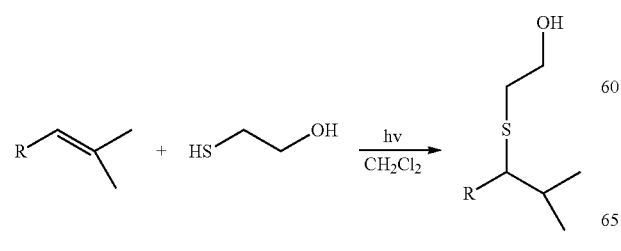

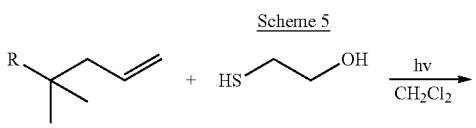

In some embodiments, these V'/E-PIB-V'/E polymers may be reacted with 2-mercapto ethanol under ultraviolet light to form the corresponding alcohol-terminated polyisobutylenes using the mechanism shown in Scheme 6, below.

Scheme 6
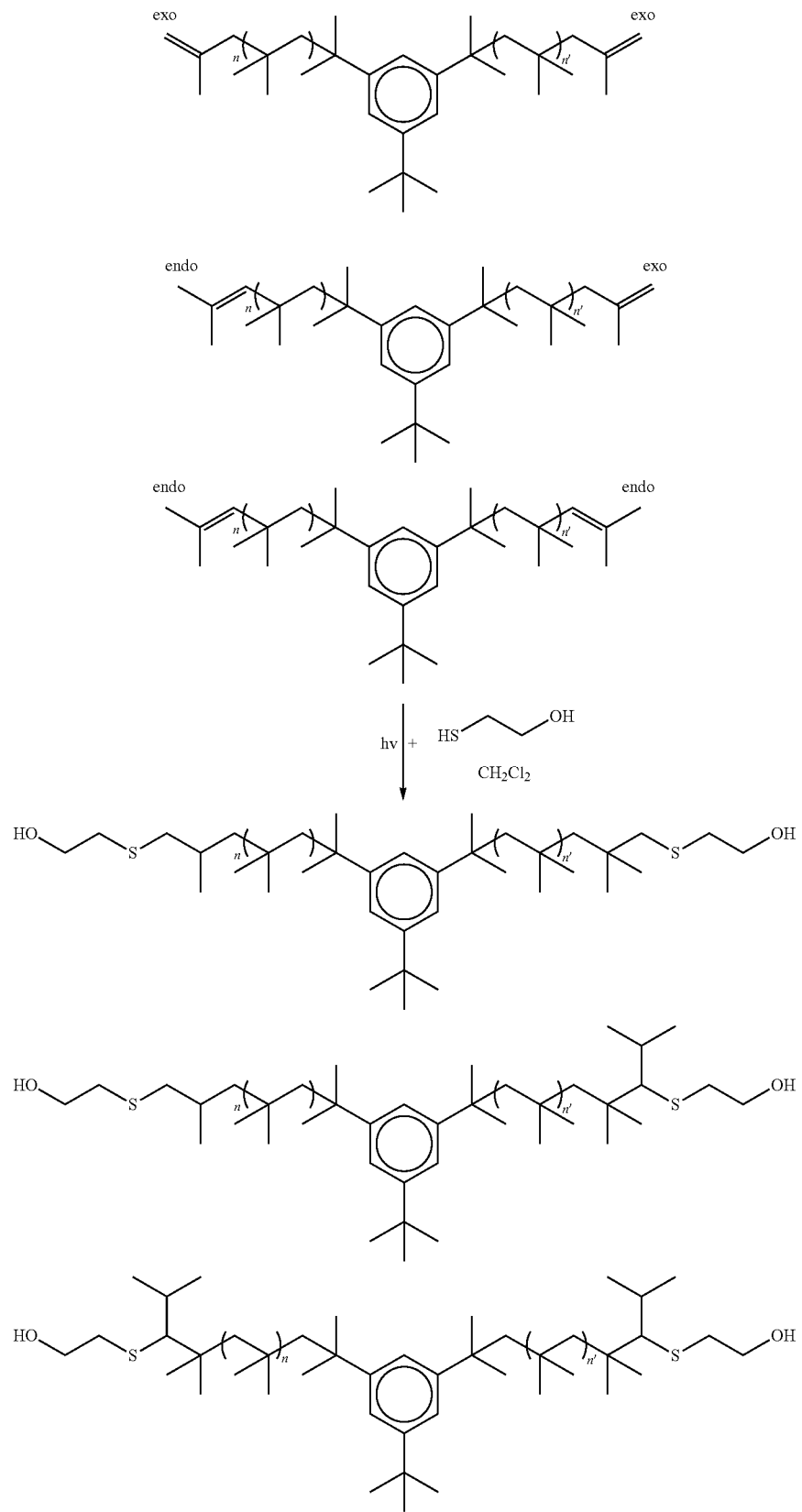

In some embodiments, the allyl-terminated PIB polymers described above may be reacted with 2-mercapto ethanol under ultraviolet light to form the corresponding alcohol-terminated polyisobutylenes, using the mechanism shown in Scheme 7, below.

Scheme 7

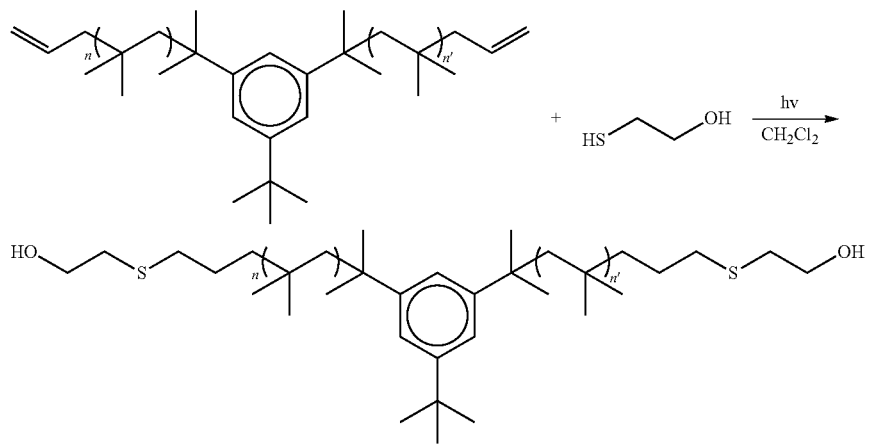

The alcohol-terminated polyisobutylenes produced may be isolated and purified using techniques well known in the art for that purpose. In some embodiments, the remaining solvent was removed under reduced pressure and the crude reaction mixture was dissolved in hexane. The resulting solution may then be washed repeatedly with methanol and placed under reduced pressure until a constant weight of alcohol-terminated polyisobutylenes is achieved.

In another aspect, the present invention is directed to polyurethanes (PUs) having improved oxidative-hydrolytic resistance prepared from the photochemically generated sulfur-containing HO-PIB-OH polymers discussed above and to methods for their making. As noted above, the primary alcohol-terminated PIBs are useful intermediates in the preparation of polyurethanes by reaction via conventional techniques, i.e., by the use of known diisocyanates such as 4,4-methylene dicyclohexyl diisocyanate (HDMI), 4,4-methylene diphenyl diisocyanate (MDI). Suitable methods for making polyurethanes from the photochemically generated HO-PIB-OH polymers discussed above may be found in U.S. Pat. No. 8,552,118 to Kennedy et al., WO 2010/039986 to Kennedy et al. and WO 2011/060161 to Kennedy et al., the disclosures of which are incorporated herein by reference in their entirety. In some embodiments, the polyurethane may be made according to the method set forth in Examples 8 and 9.

As will be apparent to those of skill in the art, the photochemically generated, sulfur containing, HO-PIB-OH polymers discussed above will form the soft segments of the polyurethane and the isocyanate component will form the hard segments of the polyurethane. In some embodiments, the soft segments formed from the photochemically generated HO-PIB-OH polymers discussed above may comprise from 10 to 90 weight percent of the polyurethane. In some embodiments, the soft segments formed from the photochemically generated HO-PIB-OH polymers discussed above may comprise from 20 to 80 weight percent of the polyurethane. In some embodiments, the hard segments may be formed from 4,4-methylene dicyclohexyl diisocyanate (HDMI). In some other embodiments, the hard segments may be formed from 4,4-methylene diphenyl diisocyanate (MDI).

In some embodiments, the polyurethane may have one or more chain extender. Any suitable chain extender known in the art for that purpose may be used including, without limitation, 1,6 hexanediol, 1,4 butanediol.

In some embodiments, a catalyst is used to facilitate formation of the polyurethane. Any suitable catalyst known in the art for that purpose may be used including, without limitation, dibutyltinlaurate (DBTL).

One advantage of the polyurethanes of at least some embodiments of the present invention is the biostability imparted to the polyurethane by the biostable PIB segment. And since PIB is known to be biocompatible, any PU made from the PIB compounds of the present invention is novel as well as biocompatible.

The hydrolytic-oxidative stability of polyurethanes obtained by the use of photochemically prepared HO-PIB-OH according to one or more embodiments of the present invention was evaluated as set forth in Example 9. According to these results, the hydrolytic-oxidative stability of polyurethanes obtained by the use of photochemically prepared HO-PIB-OH is superior to the conventional polyurethane, and can be used in various demanding medical applications.

Finally, the overall cost of the products, as determined by the cost of the starting materials and the procedures, is of decisive importance because only low cost commercially feasible simple syntheses are considered. When these factors are considered, it is believed that the present invention presents a lower cost alternative to conventional methods of polyurethane synthesis.

In light of the foregoing, it should be appreciated that the present invention significantly advances the art by providing an alcohol-terminated polyisobutylene (PIB) compound, polyurethane made therefrom and, related methods that are structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

In order to demonstrate practice of the invention, the following examples are offered to more fully illustrate the invention, but are not to be construed as limiting the scope thereof. Further, while some of examples may include conclusions about the way the invention may function, the inventors do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Preparation of HO-PIB-OH from exo- (-V') and endo (-E) Olefin-Terminated PIBs

The purpose of this model experiment was to mimic subsequent polymer experiments, i.e., to facilitate the development of conditions of polymer experiments for the efficient preparation of HO-PIB-OHs.

In order to evaluate the basic reaction mechanism, an experiment was carried out using a commercially available isobutylene dimer comprising a 3:1 mixture of 2,4,4-trimethyl-1-pentene and 2,4,4-trimethyl-2-pentene and 2-mercapto ethanol (HS—CH$_2$CH$_2$—OH, SEOH). The isobutylene dimer is an excellent model of the exo and endo end groups present in conventional PIB as this dimer contains the same exo and endo unsaturations as the end groups of conventional PIB.

The following equations summarize the chemical reactions expected (and indeed found) to occur in the experiment:

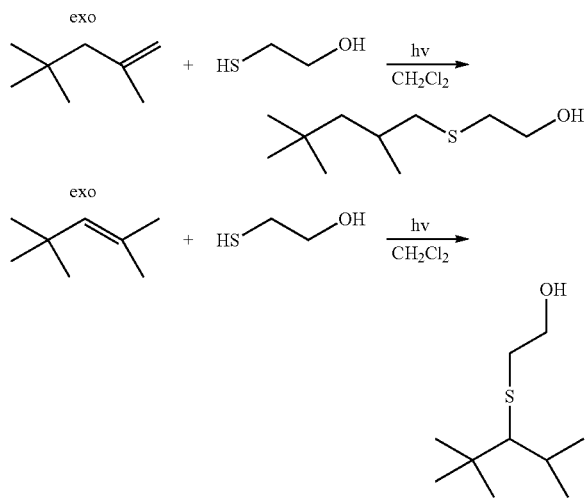

The experiment was carried out as follows: 2,4,4-trimethyl-1-pentene (0.15 g and 1.34 mmol), 2,4,4-trimethyl-2-pentene (0.05 g and 0.45 mmol), 2-mercapto ethanol (0.7 g, 8.96 mmol), 2,2-dimethoxy-2-phenyl acetophenone (DMPA) catalyst (0.02 g, 1 wt %), and 1 mL CH$_2$Cl$_2$ were charged to a 25 mL round bottom glass flask. The solution was irradiated by a medium pressure Hg lamp (the UV source) for 15 min at 0° C. The solvent was removed under reduced pressure and the crude reaction mixture was dissolved in hexane. The resulting solution was washed three times with methanol and placed under reduced pressure until constant weight was achieved.

FIG. 1 shows the proton NMR spectra of the starting ingredients and the products, 2-[(2,4,4-trimethylpentyl)thiol]-ethanol and 2-[(1-ethyl-2,2-dimethylpropyl)thiol]-ethanol. The disappearance of the characteristic peaks of the two olefinic protons of both 2,4,4-trimethyl-1-pentene and 2,4,4-trimethyl-2-pentene indicated the formation of desired products as set forth in the equations above.

Example 2

Polymer Experiments with PIB-V's

An experiment was carried out using a PIB containing predominantly terminal vinylidene (-V') groups (Glissopal® 1000, BASF Company), and 2-mercapto ethanol. A mixture containing Glissopal® 1000 (5 g,) and 2-mercapto ethanol (0.565 g, Sigma Aldrich Co.) dissolved in CH$_2$Cl$_2$ (about 14 mL), was prepared in a 100 mL round bottom flask under a nitrogen atmosphere. The solution was stirred by a magnetic stirring bar and irradiated by a medium pressure Hg lamp at a temperature of from about 0° C. to about 5° C. Then, after 10 min of stirring at room temperature, the solution was poured into 150 mL methanol, and the reaction product (polymer) was precipitated, filtered and dried under vacuum. Conversion was 55%.

Figure 2:
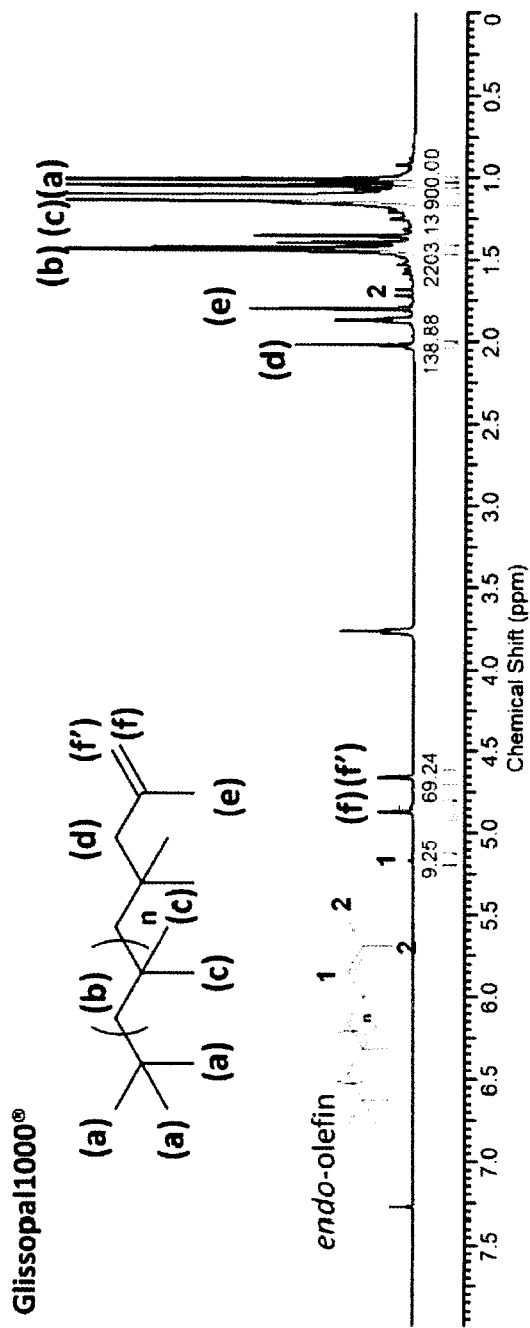
FIG. 2 is a $^1$H NMR spectrum of Glissopal® 1000.
Figure 3:
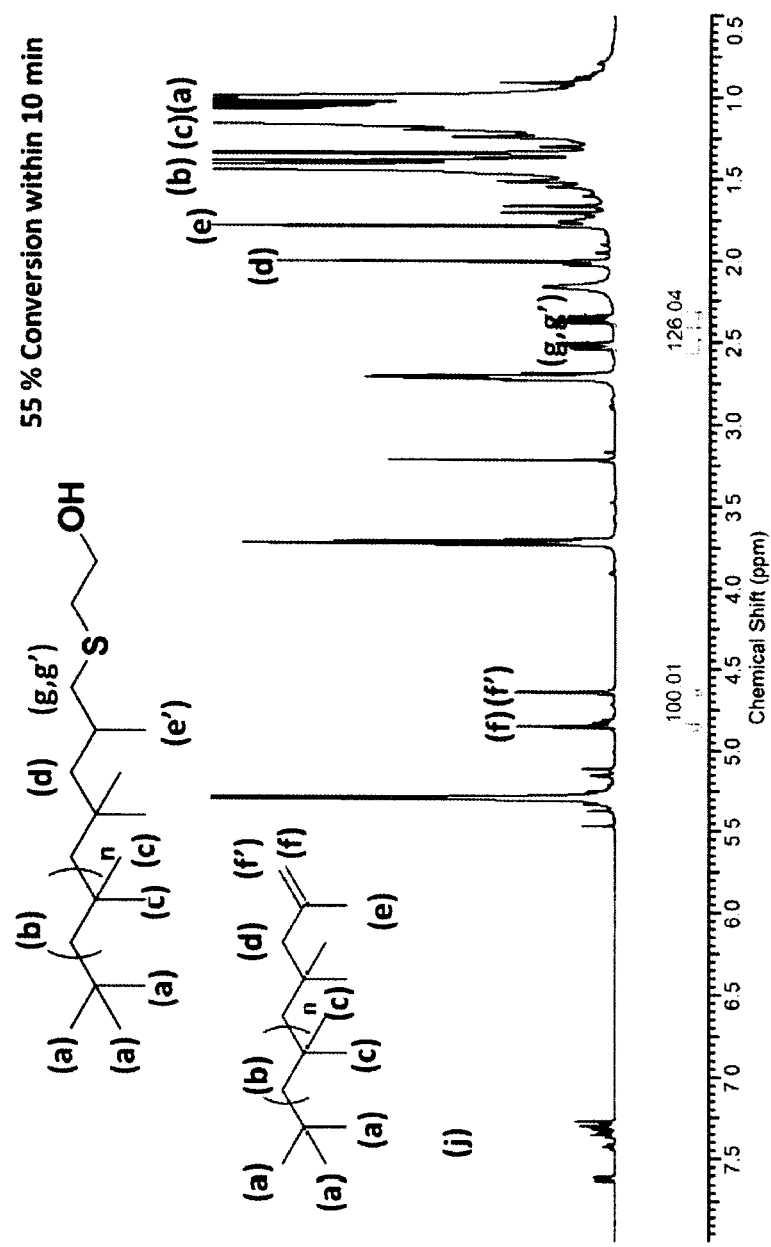
FIG. 3 is a $^1$H NMR spectrum of a hydroxyl-terminated PIB made according to at least one embodiment of the present invention.

The reaction product was analyzed by proton NMR spectroscopy. According to the proton NMR spectra of Glissopal® 1000 and the hydroxyl terminated PIB (FIGS. 2 and 3, respectively), the main product exhibited the expected structure.

Example 3

Formation of V'/E-PIB-V'/E

V'/E-PIB-V'/E can be readily obtained by initiating the polymerization of isobutylene with dimethyl-5-tert-butyl-1,3-benzyl dicarboxylate (DMTBBDC) difunctional initiator under conventional (non-living) cationic polymerization conditions. A representative procedure to prepare V'/E-PIB-V'/E (Mn=3000 g/mol) shown in Scheme 8, below and is carried out in two steps as follows: (a) The polymerization of isobutylene with aDMTBBDC/TiCl$_4$ initiator system is carried out under a nitrogen atmosphere at −80° C. Thus, into a 500 mL round bottom flask equipped with magnetic stirrer are placed 51 mL hexane and 30 mL CH2Cl$_2$ and the stirred system is cooled to −80° C. Then solutions of 0.04 g ditertiarybutylpyridine (DTBP) in 4 mL hexane, 0.31 g DMTBBDC in 5 mL hexane, and 6 g isobutylene are added and the system is stirred for 5 min. The polymerization is initiated by the addition of 6.0 mL (1.0 M) TiCl$_4$. After 30 min the polymerization is quenched with prechilled methanol and the product is isolated and purified. The PIB so formed contains tert-chlorine end groups.

Subsequently, the product is dissolved in ~100 mL tetrahydrofuran, and the solution is refluxed. Dehydrochlorination is accomplished by the addition of t-BuOK according the well-known procedure.

Scheme 8

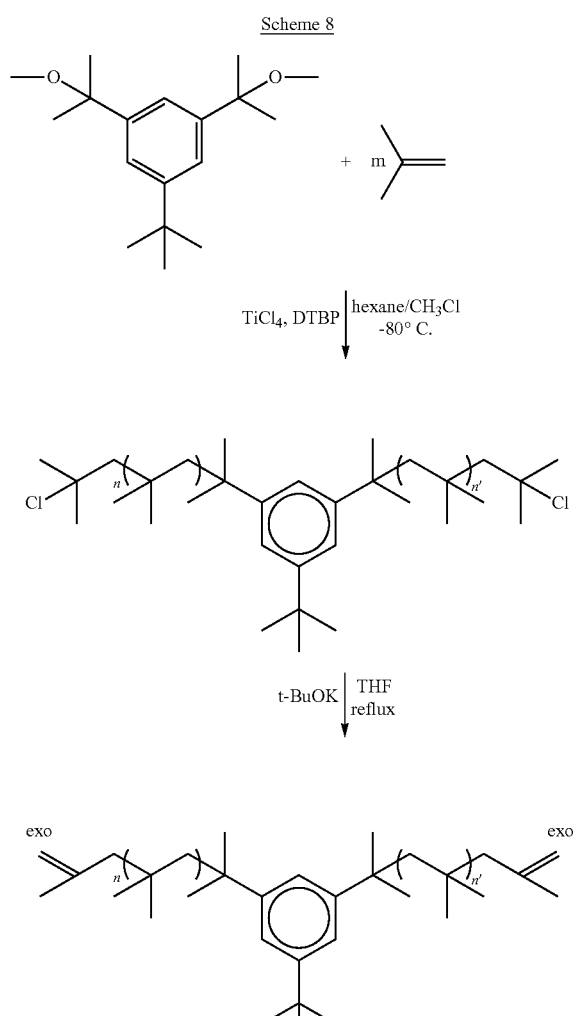

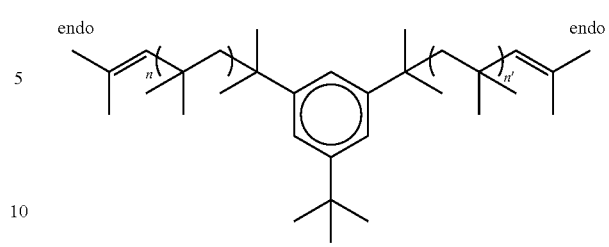

As can be seen in Scheme 8, the product of dehydrochlorination is a PIB mixture of exo and endo end groups (V'/E-PIB-V'/E) in high yield, as was determined by proton NMR spectroscopy.

Example 4

Formation of OH-PIB-OH from V'/E-PIB-V'/E

Scheme 6 above shows the structures of these V'/E-PIB-V'/E starting materials and the products obtained when these molecules are mixed with 2-mercapto ethanol and exposed to UV light. A representative procedure for the synthesis (see Table 1) of the OH-PIB-OH polymer is as follows: V'/E-PIB-V'/E (see above), 2,2-dimethoxy-2-phenyl acetophenone, DMPA catalyst, and $CH_2Cl_2$ are charged to a 50 mL round bottom glass flask under nitrogen atmosphere. Subsequently, 2-mercapto ethanol ($HSCH_2CH_2OH$) is added to the solution and the system is stirred 30 min. The system is then irradiated by a medium pressure Hg lamp for 60 min in an ice bath. The solvent is removed under reduced pressure and the crude reaction mixture is dissolved in hexane. The resulting solution is washed three times with methanol and placed under reduced pressure until constant weight is achieved.

TABLE 1

Synthesis details of thiol-ene click reaction

| Sample | V'/E-PIB-V'/E (3000 g/mol) | SEOH (3 eq.) | $CH_2Cl_2$ mL | DMPA (mg) [1.0 eq] | Time (min) |
|---|---|---|---|---|---|
| V'/E-PIB-V'/E + SEOH (1:1.5 mole ratio) 40 Watt (0-5° C.) | 1.1325 g 0.2638 mmol | 0.06 mL 0.062 g | 2.64 mL | 78 | 60 |

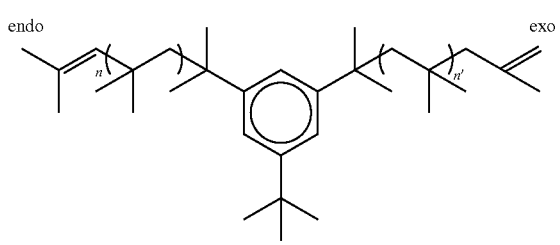

The product was characterized by $^1$H NMR spectroscopy. The resonances corresponding to the endo olefin proton at 5.1 and exo olefin protons at 4.6 and 4.8 ppm in V'/E-PIB-V'/E are absent. New resonances at 2.52 and 2.35 ppm, and at 2.0 and 2.75 ppm are observed due to the thiol-ene adduct of the exo and endo unsaturations, respectively.

Example 5

Synthesis of the Difunctional Initiator

Figure 4:
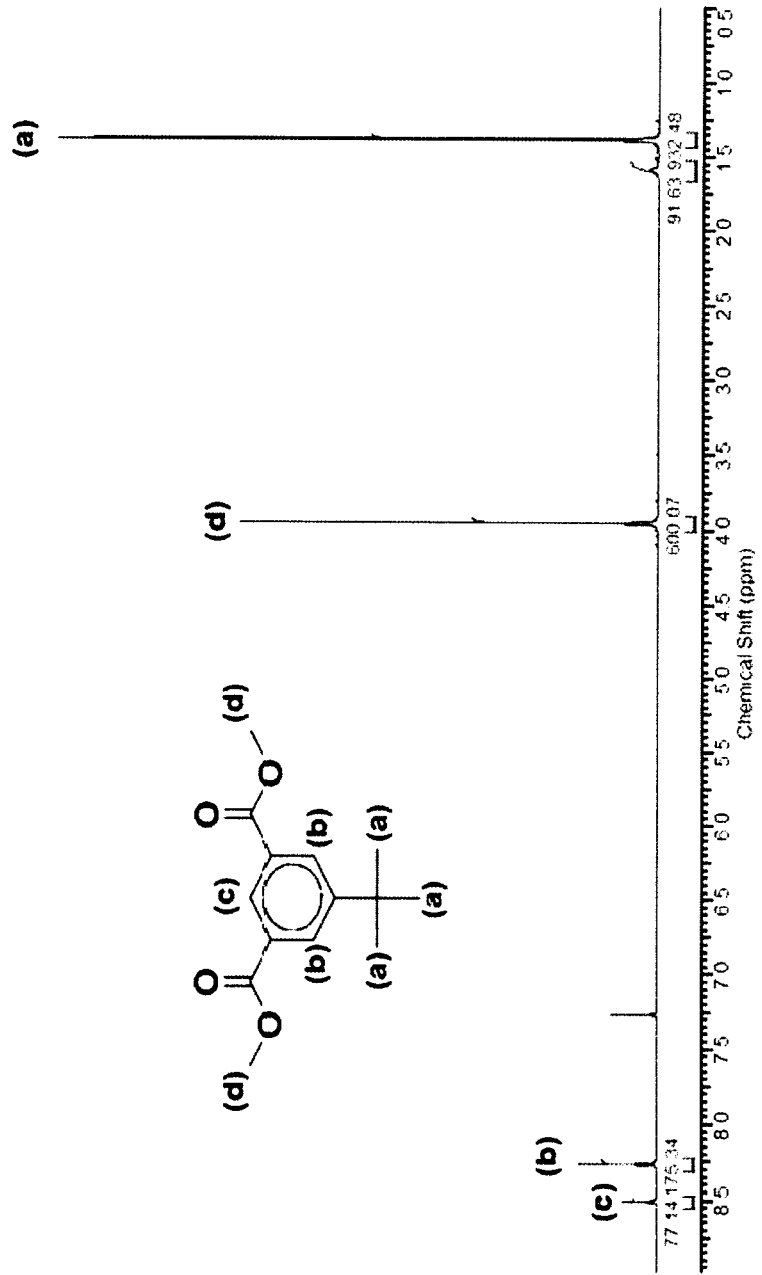
FIG. 4 is a $^1$H NMR spectrum of 5-tert-butyl-1,3-benzenedicarboxylate.

As shown in Scheme 1 above, the synthesis of the difunctional initiator 5-tert-butyl-1,3-(2-methoxy-2propyl)

benzene (TBDMPB) was undertaken in three steps. The first step was the synthesis of dimethyl-5-tert-butyl-1,3-benzyl dicarboxylate. Thus, 3,5-di-carboxyl-1-tert-butylbenzene (35.52 g, 0.16 moles) was esterified by refluxing for 48 h in $CH_3OH$ (700 ml, 17.5 mL) in the presence of concentrated $H_2SO_4$ (68 mL). The mixture was cooled to room temperature, stored at 0° C. overnight, the solid was filtered and washed with water until the filtrate was acid free. The wet solid was freeze dried, dissolved in 200 mL THF, dried over $MgSO_4$ overnight, and filtered. The solvent was evaporated and the product was recovered. Conversion was 97%. $^1H$ NMR spectroscopy (FIG. 4) showed resonances of the methyl protons of the tert-butyl group (1.28 ppm), the methyl protons of the ester groups (3.9 ppm), and the aromatic protons (8.20-8.50 ppm).

In the second step, 5-tert-butyl-1,3-dicumyl alcohol (TB-DCA) was prepared by combining 10 g (0.04 moles) of the DMTBBDC (obtained in the first step, above) and methyl magnesium bromide (0.2 moles, 70 mL, 2.8 M) dissolved in 100 mL anhydrous THF, at 0° C. under dry $N_2$ atmosphere. The reaction product was extracted by diethyl ether, the ether phase was dried over $MgSO_4$, and the solvent was evaporated. The yield of 5-tert-butyl-1,3-dicumyl alcohol (TBDCA) was greater than 95%.

Figure 5:
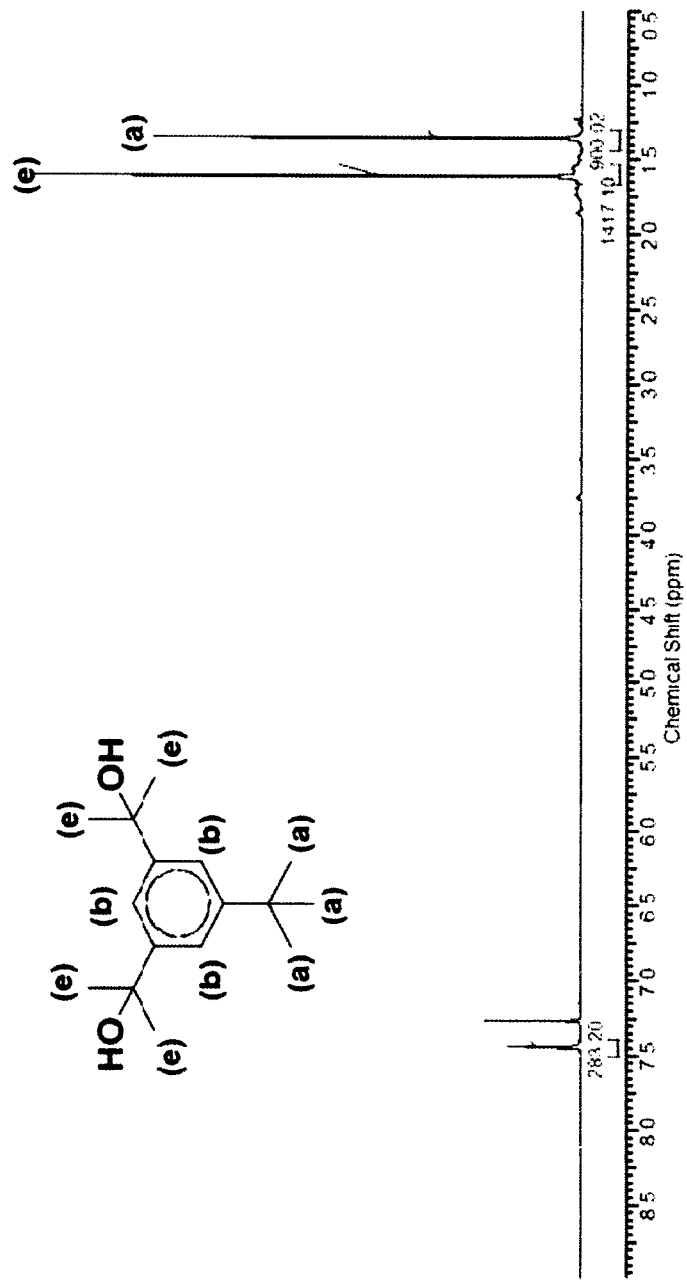
FIG. 5 is a $^1$H NMR spectrum of 5-tert-Butyl-1,3-dicumylalcohol.

$^1H$ NMR spectroscopy (FIG. 5) showed resonances at 1.25, 1.45, and 7.1-7.25 ppm characteristic of the methyl protons of the t-butyl group, the methyl protons of isopropyl groups and the aromatic protons, respectively.

The third and final step in the synthesis of the difunctional initiator was the conversion of the 5-tert-butyl-1,3-dicumyl alcohol to the corresponding methyl ether, 5-tert-butyl-1,3-(2-methoxy-2propyl)benzene (TBDMPB). Thus, NaH (0.155 moles, 3.71 g) was dispersed in 50 mL dry THF and TBDCA (10 g, 0.04 moles) dissolved in 35 mL of dry THF was added dropwise at 0° C. The reaction temperature was increased to 25° C. and the solution was stirred for 30 min. Methyl iodide (MeI) (14.64 mL, 0.235 moles) was then added dropwise for 60 min at 0° C. The reaction was allowed to proceed overnight after which time 30 mL pentane was added to precipitate any polymer that formed during the reaction. The clear solution was separated by vacuum filtration and the solvent was evaporated under reduced pressure to isolate the product. Conversion was 98%.

Figure 6:
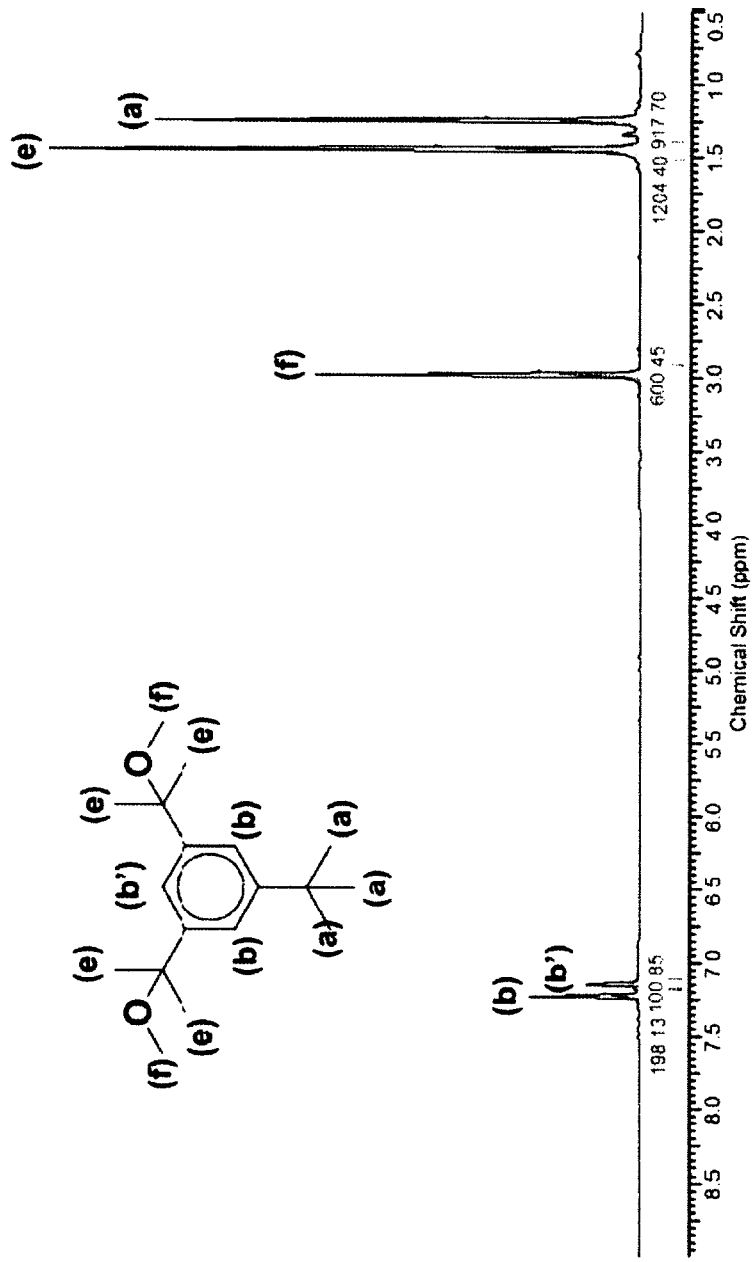
FIG. 6 is a $^1$H NMR spectrum of 5-tert-butyl-1,3-(2-methoxy-2-propyl)benzene.

$^1H$ NMR spectroscopy (FIG. 6) showed resonances at 1.35, 3.00, and 7.2-7.3 ppm, characteristic of the methyl protons of tert-butyl group, the methyl protons of methoxy groups, and the aromatic protons, respectively. This difunctional initiator was subsequently used to prepare HO-PIB-OH, as set forth below.

Example 6

Synthesis of Allyl-Telechelic PIB (A-PIB-A) Using the TBDMPB Initiator

A representative strategy for preparing the allyl-telechelic PIB (A-PIB-A) using a TBDMPB initiator is set forth in Scheme 2 above.

Figure 7:
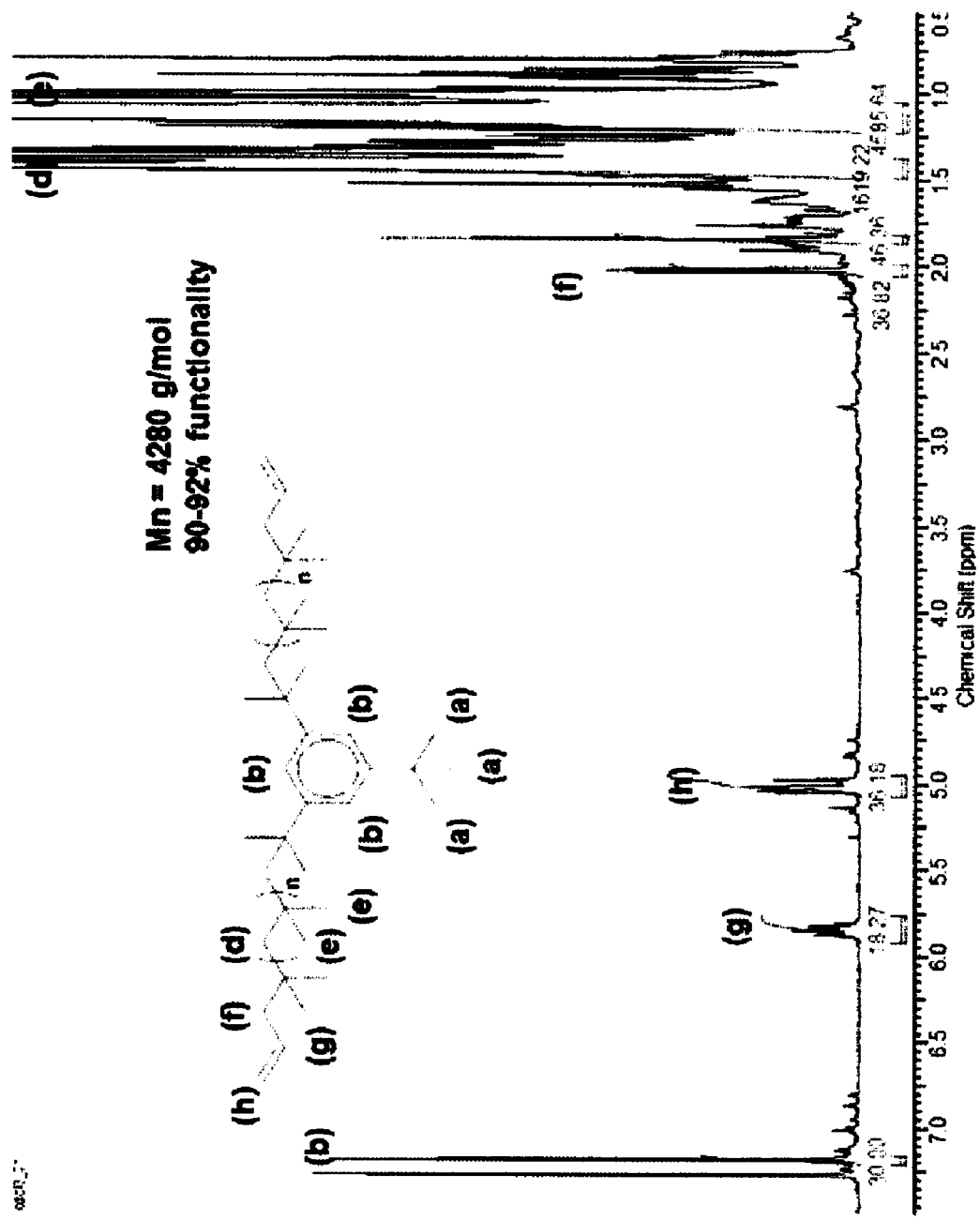
FIG. 7 is a $^1$H NMR spectrum of A-PIB-A.
Figure 8:
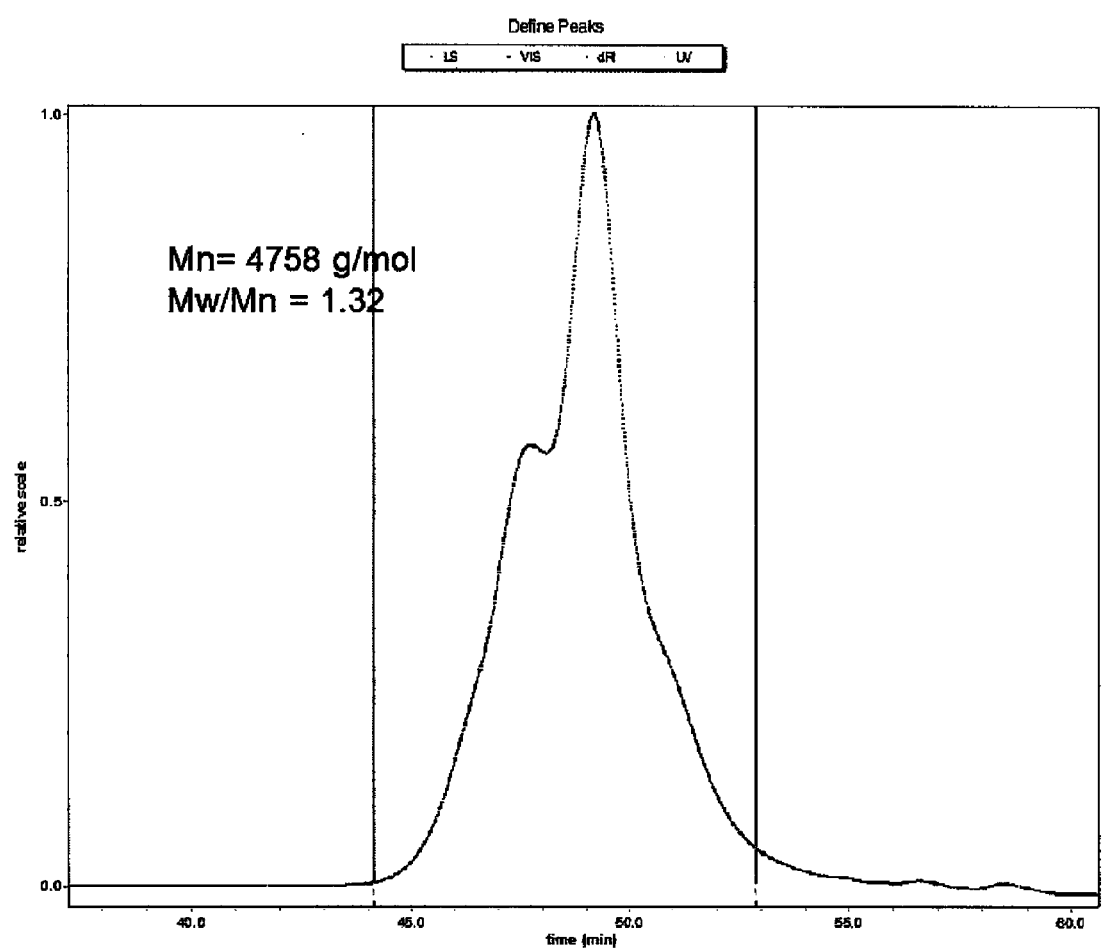
FIG. 8 is a GPC trace of A-PIB-A.

The polymerization of isobutylene was carried out in a high vacuum/dry nitrogen line at −80° C. as follows. Into a 500 mL round bottom flask equipped with a magnetic stirrer were placed 180 mL dried and distilled hexane, 120 mL dried and distilled dichloromethane, and ditertbutylpyridine (DTBP)($1.25 \times 10^{-3}$ mol), and the system was cooled to −80° C. Under strong stirring, $1.25 \times 10^{-2}$ mol of the TBDMPB initiator was added and over a period of 5 min. Then 0.45 mol of isobutylene was added followed by the immediate addition of $3.75 \times 10^{-2}$ mol of $TiCl_4$. The polymerization was allowed to proceed for 60 min and then terminated with 0.25 mol distilled and prechilled allyltrimethylsilane (ATM). After 30 min, the dichloromethane was evaporated under reduced pressure, the product was poured into 200 ml saturated aqueous $NaHCO_3$. The organic layer was then separated and the solvent evaporated under reduced pressure. The reaction product (polymer) was dissolved in hexane and dried over $MgSO_4$ overnight. After filtration and evaporation of the solvent by a rotavap, the polymer was dried in vacuo. The product was characterized by $^1H$ NMR spectroscopy (FIG. 7) and gel permeation chromatography (GPC) (FIG. 8).

The observed resonances in the $^1H$ NMR spectrum indicate the presence of allyl end groups (5.10 and 5.85 ppm) and the methylene protons of PIB (2.00 ppm). Molecular weight and functionality calculated from $^1H$ NMR data were 4280 g/mol and 90-92%, respectively. The GPC chromatogram showed bimodal molecular weight distribution with a heterogeneity index 1.32.

Example 7

Synthesis of HO-PIB-OH by the Thiol-Ene Click Reaction of A-PIB-A and 2-Mercaptoethanol The structures of the starting materials and the product obtained are shown in Scheme 7 above. A representative synthesis procedure, with details as shown in Table 2, was as follows: A-PIB-A (see above), 2,2-dimethoxy-2-phenyl acetophenone, DMPA catalyst and $CH_2Cl_2$ were charged to a 50 mL round bottom glass flask under a nitrogen atmosphere. Subsequently, 2-mercapto ethanol was added to the solution and the system was stirred 30 min. The solution was then irradiated by a medium pressure Hg lamp (Omnicure 2000S) for 60 min in an ice bath. The solvent was removed under reduced pressure and the crude reaction mixture was dissolved in hexane. The resulting solution was washed three times with methanol and placed under reduced pressure until constant weight was achieved.

TABLE 2

| | Synthesis details of thiol-ene click reaction | | | | | |
|---|---|---|---|---|---|---|
| Sample | A-PIB-A (4280 g/mol by NMR) | SEOH (1.5 eq. per allyl group) | $CH_2Cl_2$ (mL) | DMPA mg [1.0 eq] | Time (min) | Conversion (%) by $^1H$ NMR |
| A-PIB-A + SEOH (1:1.5 mole ratio) 40 Watt (25° C.) | 1.5100 g 0.3512 mmol | 0.07 mL (0.082 g) | 3.52 | 101 | 60 | 100 |

TABLE 2-continued

Synthesis details of thiol-ene click reaction

| Sample | A-PIB-A (4280 g/mol by NMR) | SEOH (1.5 eq. per allyl group) | CH$_2$Cl$_2$ (mL) | DMPA mg [1.0 eq] | Time (min) | Conversion (%) by $^1$H NMR |
|---|---|---|---|---|---|---|
| A-PIB-A + SEOH (1:1.5 ratio) 40 Watt (0-5° C.) | 1.1325 g 0.2638 mmol | 0.06 mL (0.062 g) | 2.64 | 78 | 60 | 100 |

Figure 9:
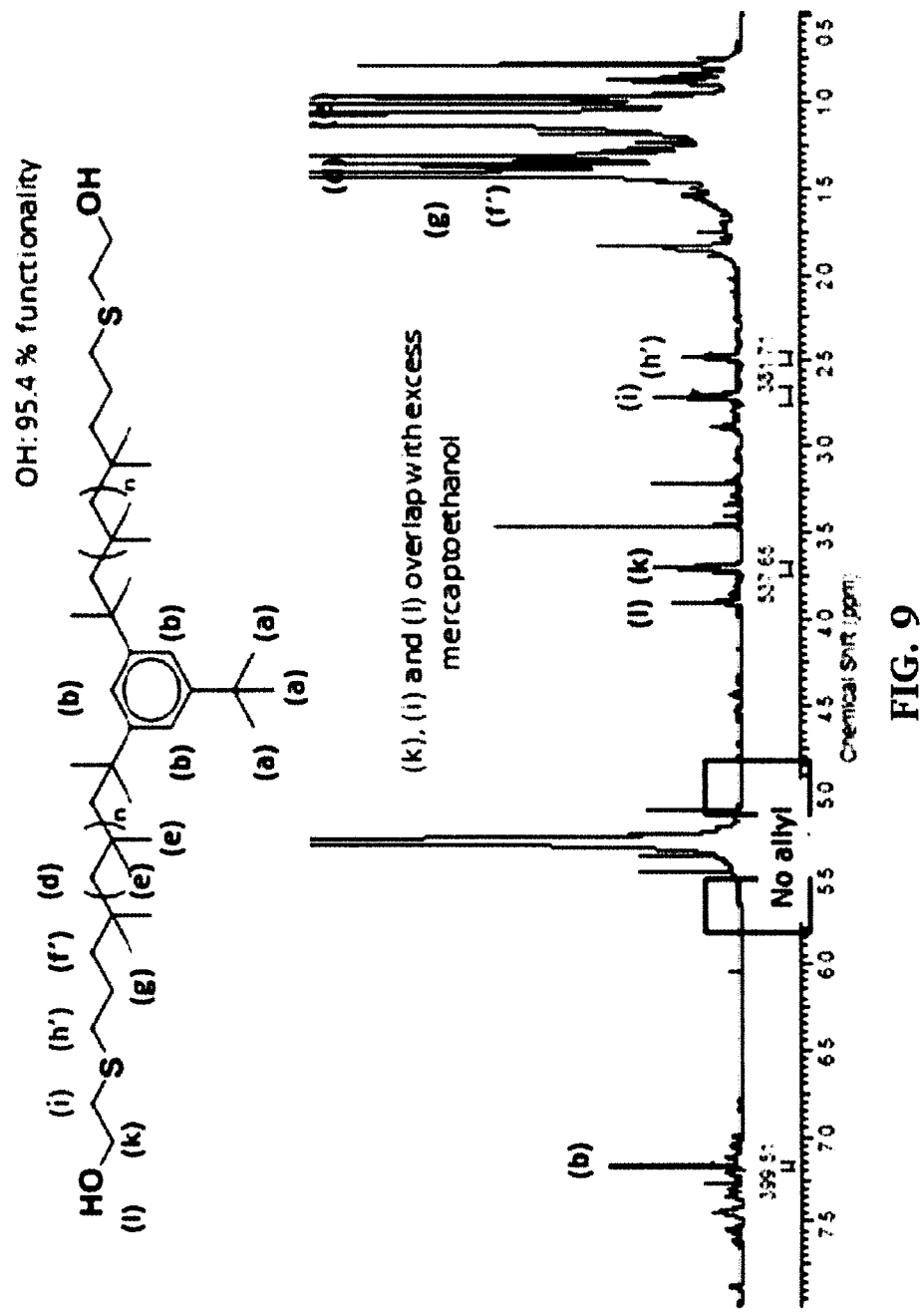
FIG. 9 is a $^1$H NMR spectrum of di-hydroxyl-telechelic PIB (HO-PIB-OH) made according to at least one embodiment of the present invention.

The product was characterized by $^1$H NMR spectroscopy (FIG. 9). Resonances corresponding to the allyl chain-end protons at 5.0, 5.7 and 2.0 ppm in A-PIB-A were absent in the product spectrum indicating that the reaction was essentially complete. The presence of two triplets at 2.5 and 2.7 ppm corresponding to methylene protons adjacent to the formed thio ether link were characteristic of the expected reaction. According to these results, the product was the target HO-PIB-OH.

Example 8

The Preparation of Polyurethanes Containing 52% Photochemically Prepared HO-PIB-OH and 12% Poly(tetramethylene Oxide) (PTMO) Soft Co-Segments To 0.8 g HO-PIB-OH (Mn=4280 g/mol) and 0.2 g HO-PTMO-OH (Gelest Co., Mn=1000 g/mol) dissolved in 3 mL dry THF, are added HMDI (0.440 g, 1.6×10$^{-3}$ moles) and a drop of dibutyltinlaurate (DBTL) catalyst (0.5% in dry THF) under a blanket of N$_2$, and the system is agitated 3 hrs at 65° C. After the about 3 hrs of stirring needed for the formation of the prepolymer, 0.116 g (9.3×10$^{-4}$ mole) of 1,6 hexanediol (HDO) dissolved in 1 mL THF was added dropwise at a temperature of 65° C., and the solution was vigorously stirred for 16 hrs. The highly viscous system was diluted with ~5 mL dry THF and poured in 7×7 cm Teflon molds. The solvent was slowly (~4 days) evaporated at room temperature The cast films were further dried by heating at 60° C. in the mold for 2 days, and by vacuum drying at 50° C. until weight constancy was reached. Finally the films were annealed by heating at 120° C. for 1 day.

Example 9

The Preparation of Polyurethanes Containing 64% Photochemically Prepared HO-PIB-OH Soft Segment Polyurethanes containing 64% photochemically prepared, sulfur containing HO-PIB-OH soft segment were prepared and their hydrolytic/oxidative stabilities analyzed and compared to a conventional polyurethane. The synthesis of this sample was carried out by the procedure described in above in Example 8 except that PTMO was not used. The hydrolytic/oxidative stabilities of the samples (solution cast films of 5×2×0.02 cm) were investigated by (a) exposure to boiling distilled water for 15 days, and (b) stirring them at 400 rpm in concentrated (36%) nitric acid for 4 h at room temperature. After these procedures, the samples were removed from the liquids, thoroughly rinsed with distilled water and dried in a vacuum at room temperature for 2 days. For comparison, the procedures are repeated with a conventional polyurethane (control) that does not include a sulfur atom therein.

Visual observations were made during experiments: While the control sample completely deteriorated upon exposure to the nitric acid, the PUs made with the HO-PIB-OH polymers of the present invention showed some yellow discoloration but otherwise did not seem to change. Tensile properties of the samples were determined using a tensile testing machine. The tests were carried out with dumbbell shaped samples tested to failure at 20 mm/min crosshead speed, and the stress versus strain data were recorded. Averages of at least 3 samples were used to determine the tensile strength. Retention of tensile strength was calculated as a percent (R %) using the formula:

$R$ (%)=[Tensile Strength(after)/Tensile Strength(before)]×100.

According to these results, the hydrolytic-oxidative stability of polyurethanes obtained by the use of photochemically prepared, sulfur containing HO-PIB-OH of at least some embodiments of the present invention was superior to that of conventional polyurethane, and may be suitable for use in various demanding medical applications.

In view of the foregoing, it should be evident that the photochemically generated, sulfur containing, hydroxyl-terminated polyisobutylene compositions of the present invention, as well as their methods of production and methods of use, are new to the art. Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A telechelic polyisobutylene composition having at least one
    primary alcohol end group, a single sulfur atom being present within each of the at least one primary alcohol end group.

2. The telechelic polyisobutylene composition of claim 1 wherein the sulfur atom is present within 3 carbon atoms of the alcohol unit in the primary alcohol end group.

3. The telechelic polyisobutylene composition of claim 2, wherein the sulfur atom is present within 2 carbon atoms of the alcohol unit in The primary alcohol end group.

4. The telechelic polyisobutylene composition of claim 1, further comprising an initiator core and at least two polyisobutylene chains extending from the initiator core, wherein each one of the at least two polyisobutylene chains is terminated with a primary alcohol end group having a sulfur atom contained therein.

5. The telechelic polyisobutylene composition of claim 4 wherein each one of the at least two polyisobutylene chains comprises an —S—CH$_2$CH$_2$—OH moiety within the primary alcohol end group.

6. The telechelic polyisobutylene composition of claim 4 wherein said initiator core is a difunctional aromatic initiator core and the telechelic polyisobutylene composition is linear and di-telechelic.

7. The telechelic polyisobutylene composition of claim 1 wherein the at least one primary alcohol end group has a chemical structural formula selected from the group consisting of:

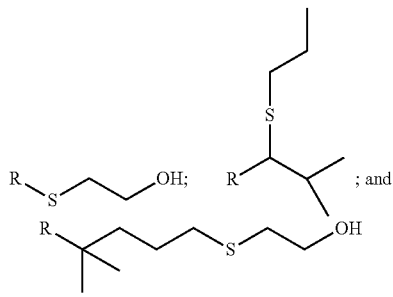

wherein R comprises a polyisobutylene polymer chain.

8. The telechelic polyisobutylene composition of claim 1 having a formula selected from the group consisting of:

9. A telechelic polyisobutylene composition comprising the photochemical thiol-ene reaction product of:

a polyisobutylene polymer having at least one end group selected from —$CH_2$—$CH(CH_3)$=$CH_2$, —$CH$=$C(CH_3)_2$, and —$CH_2$—$CH$=$CH_2$ and combinations; and a mercapto alcohol, in the presence of UV light.

10. The telechelic polyisobutylene composition of claim 9 wherein the mercapto alcohol is 2-mercapto ethanol.

11. The telechelic polyisobutylene composition of claim 10 wherein said polyisobutylene polymer has a formula selected from the group consisting of:

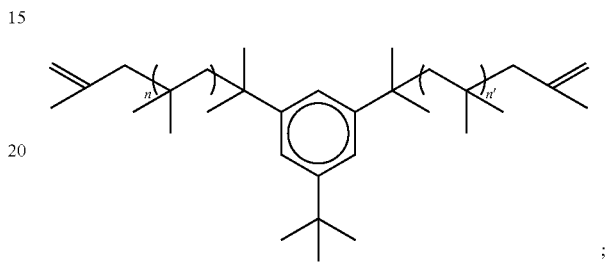

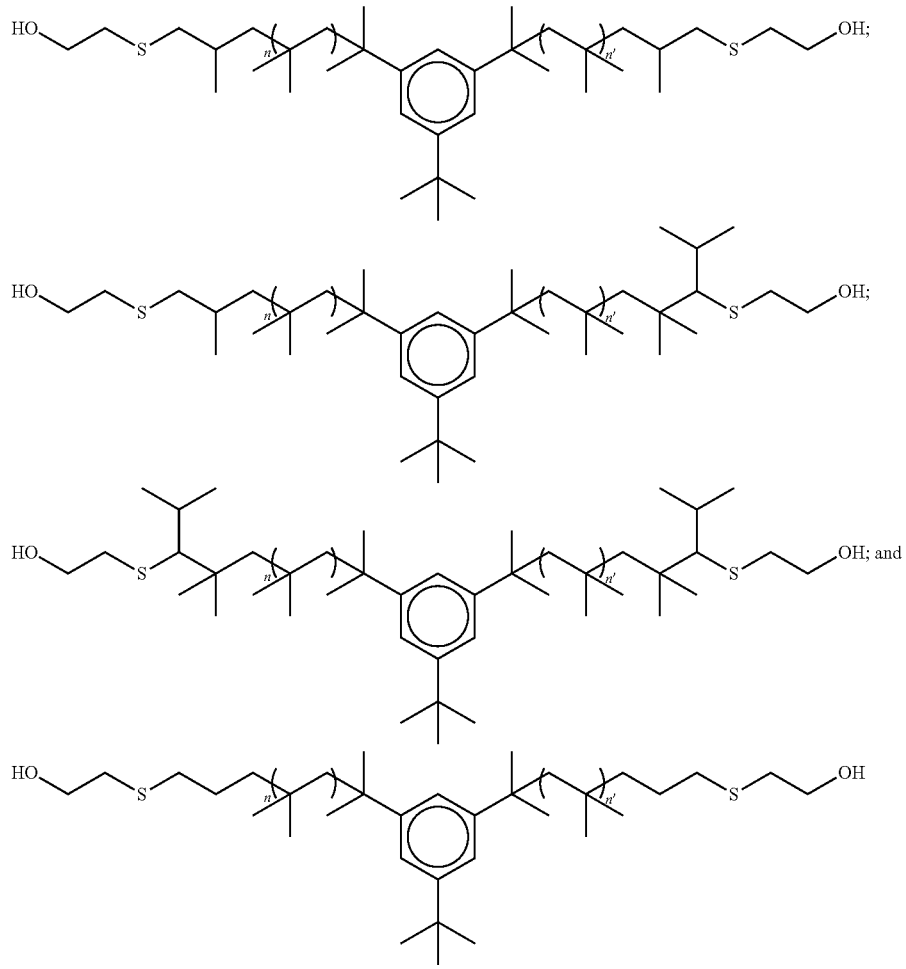

wherein n and n' are each an integer from 2 to 5,000.

-continued

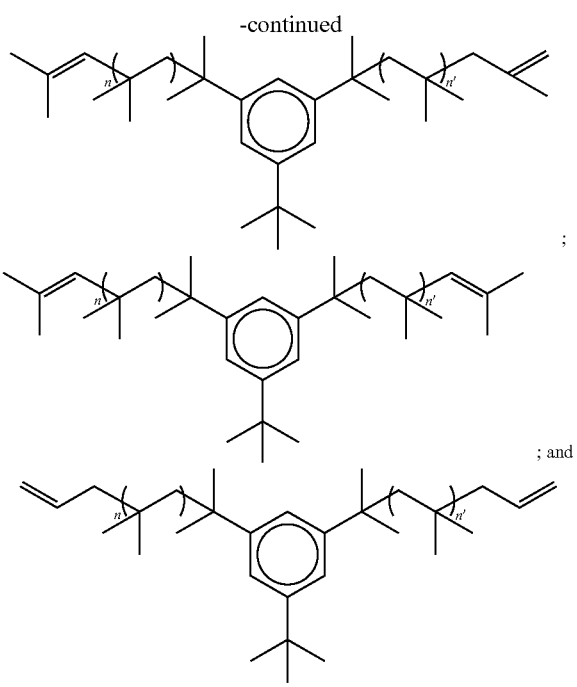

wherein n and n' are each an integer from 2 to 5,000.

12. A polyurethane composition having improved hydrolytic-oxidative stability comprising the reaction products of:

one or more telechelic polyisobutylenes having at least two alcohol-terminated end groups, the at least two alcohol-terminated end groups each having a single sulfur atom present therein; and one or more diisocyanates.

13. The polyurethane composition of claim 12 wherein the one or more diisocyanates are selected from the group consisting of 4,4-methylene dicyclohexyl diisocyanate (HDMI), 4,4-methylene diphenyl diisocyanate (MDI), and combinations thereof.

14. The polyurethane composition of claim 13, wherein each of the at least two alcohol-terminated end groups of the one or more telechelic polyisobutylenes includes an —S—$CH_2CH_2$—OH moiety 15. The polyurethane composition of claim 12, wherein the one or more telechelic polyisobutylenes are selected from the group consisting of:

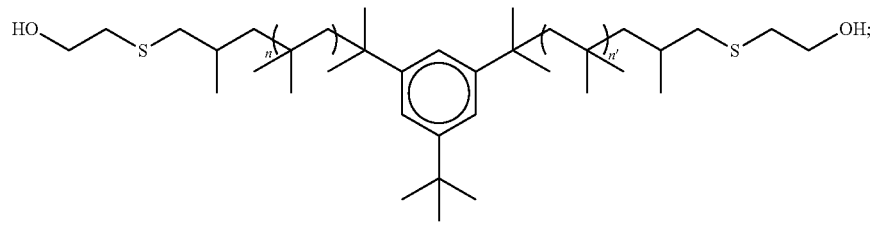

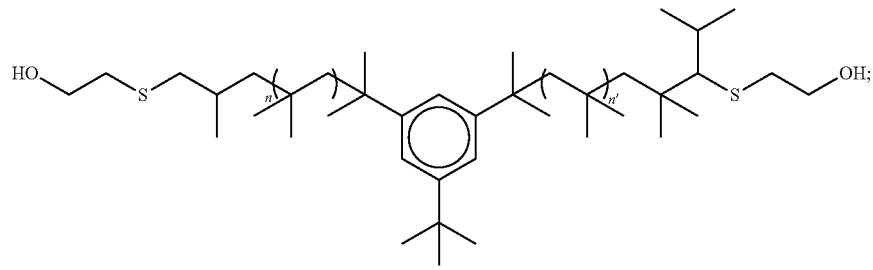

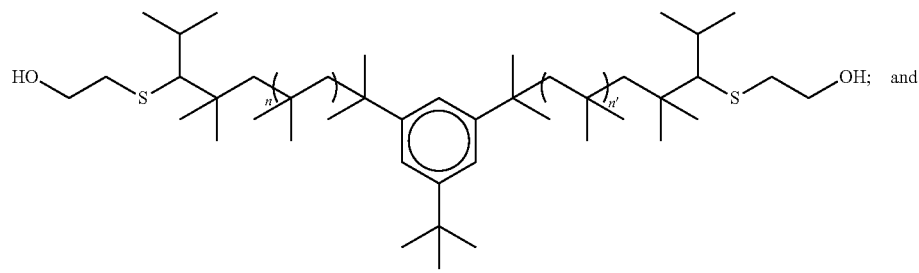

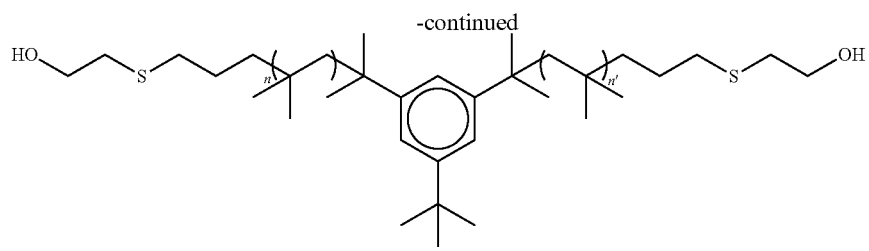

wherein n and n' are the same or different and are each an integer ranging from to 5,000.

16. A method of making a telechelic polyisobutylene composition having one or more alcohol-terminated end groups, each having a single sulfur atom contained therein, the method comprising:
(a) providing a polyisobutylene polymer having at least one end group selected from the end groups —CH$_2$—CH(CH$_3$)=CH$_2$, —CH$_2$=C(CH$_3$)$_2$, and CH$_2$—CH=CH$_2$, and combinations thereof;
(b) combining the polyisobutylene polymer with a stoichiometricly sufficient quantity of a mercapto alcohol to provide a mixture;
(c) irradiating the mixture with UV light.

17. The method of claim 16 wherein said mercapto alcohol is 2-mercapto ethanol.

18. The method of claim 16, wherein the polyisobutylene polymer has a formula selected from the group consisting of:

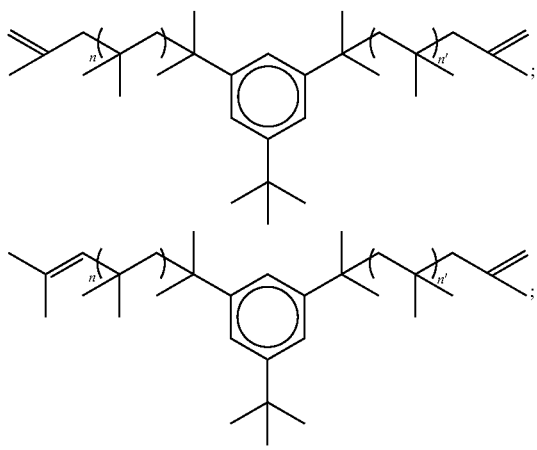

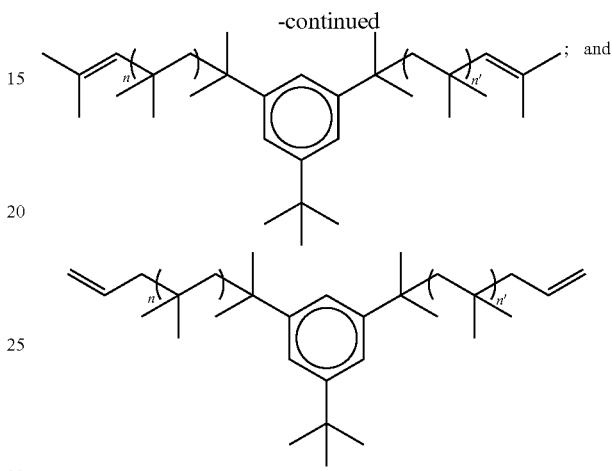

wherein n and n' are each an integer from 2 to 5,000.

19. A method for the production of a polyisobutylene-based polyurethane having improved hydrolytic-oxidative stability, the method comprising:
(a) providing a photochemically-prepared telechelic polyisobutylene having at least two primary alcohol-terminated end groups, wherein a single sulfur atom is present within each of the primary alcohol-terminated end groups;
and
(b) adding a diisocyanate selected from the group consisting 4,4-methylene dicyclohexyl diisocyanate (HDMI), 4,4-methylene diphenyl diisocyanate (MDI), and combinations thereof, and a catalyst, to the photochemically-prepared telechelic polyisobutylene, to provide a polyurethane having improved hydrolytic-oxidative stability.

* * * * *

UNITED STATES PATENT AND TRADEMARK OFFICE
CERTIFICATE OF CORRECTION

| | | |
|---|---|---|
| PATENT NO. | : 9,701,781 B2 | Page 1 of 1 |
| APPLICATION NO. | : 14/771021 | |
| DATED | : July 11, 2017 | |
| INVENTOR(S) | : Joseph Kennedy, Nihan Nugay and Turgut Nugay | |

It is certified that error appears in the above-identified patent and that said Letters Patent is hereby corrected as shown below:

In the Claims

Column 33, Line 10 Claim 7, the chemical structure formula should include "OH" at the top above the "S"

Column 37, Line 14 Claim 15, should read "integer ranging from 2 to 5,000"

Signed and Sealed this
Fifth Day of September, 2017

Joseph Matal
*Performing the Functions and Duties of the*
*Under Secretary of Commerce for Intellectual Property and*
*Director of the United States Patent and Trademark Office*